United States Patent [19]

Simcoe

[11] 4,223,379
[45] Sep. 16, 1980

[54] ELECTRONIC APPLIANCE CONTROLLER WITH FLEXIBLE PROGRAM AND STEP DURATION CAPABILITY

[75] Inventor: Robert J. Simcoe, Liverpool, N.Y.

[73] Assignee: General Electric Company, Louisville, Ky.

[21] Appl. No.: 913,252

[22] Filed: Jun. 6, 1978

[51] Int. Cl.² .................. G06F 15/46; H01H 43/00
[52] U.S. Cl. .................. 364/104; 307/141.4; 328/130; 364/400
[58] Field of Search .......... 364/104, 400; 307/141, 307/141.4, 293; 328/130

[56] References Cited

U.S. PATENT DOCUMENTS

| | | | |
|---|---|---|---|
| 3,464,673 | 9/1969 | Cargo et al. | 307/141 X |
| 3,477,258 | 11/1969 | Walker et al. | 307/141 X |
| 3,539,153 | 11/1970 | Wennerberg et al. | 307/141 X |
| 3,610,996 | 10/1971 | Rusterholz | 313/157 |
| 3,639,844 | 2/1972 | Karklys | 328/130 |
| 3,774,056 | 11/1973 | Sample et al. | 307/141 X |
| 3,783,651 | 1/1974 | Karklys | 307/141 X |
| 3,790,815 | 2/1974 | Karklys | 307/141 |
| 3,824,480 | 7/1974 | Eshraghian | 328/130 X |
| 3,829,784 | 8/1974 | Eshraghian | 328/130 |
| 3,840,752 | 10/1974 | Eshraghian | 307/141 |
| 4,001,599 | 1/1977 | Karklys | 307/141 |
| 4,068,179 | 1/1978 | Sample et al. | 328/130 X |
| 4,084,237 | 4/1978 | Beachem et al. | 364/104 X |
| 4,104,542 | 8/1978 | Karklys et al. | 307/144.4 X |

*Primary Examiner*—Jerry Smith
*Attorney, Agent, or Firm*—Radford M. Reams; Bruce A. Yungman

[57] ABSTRACT

An electronic sequence type controller structure having a high degree of flexibility in programming the time durations of particular steps in the program. The controller which includes a digital program sequence counter capable of stepping from one state to the next in response to inputted clock pulses, each state representing a particular program step. A programmable digital counter, programmed by a timer setting control, is operable to count inputted clock pulses and to output a signal when the number of clock pulses corresponding to a programmed time duration have been inputted. A program memory is responsive to the state of the program sequence counter for directing the timer setting control to program a time duration desired for any particular program step into the programmable timer. To direct the overall operation to effect periodic program advancing operations there is provided a control logic means. In operation, the control logic means is operable to direct a clock pulse to the programmable timer for each program advancing operation in the event a signal has not been received from the programmable timer and a program step is therefore in progress. When a program step is completed, a signal is received from the programmable timer and the control logic means is then operable to direct a clock pulse to the program sequence counter to cause stepping to the next program step, whereupon the program memory directs the timer setting control to program a new time duration into the programmable timer.

23 Claims, 15 Drawing Figures

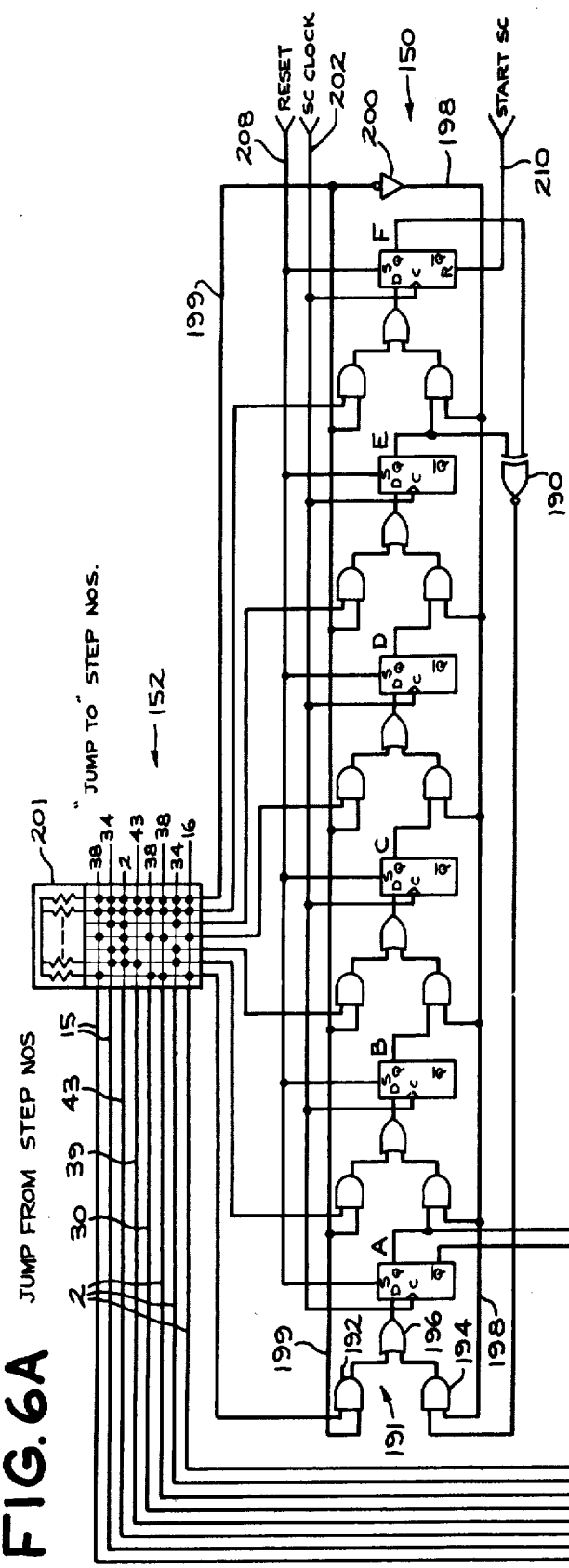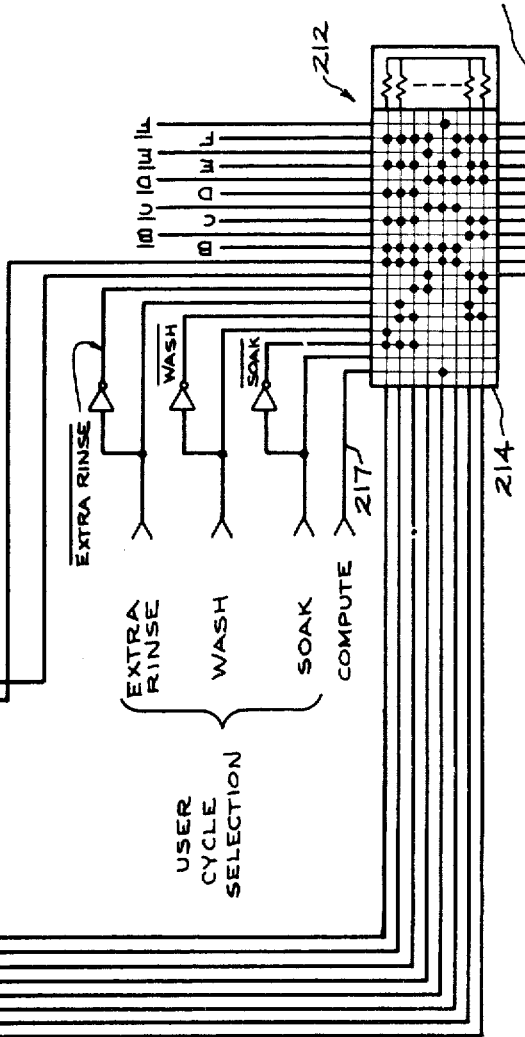
FIG. 6A
FIG. 6B
FIG. 6

PROGRAMMABLE TIMER SEQUENCE CHART

| COUNT NO. | COUNTER STATE G H I J K | TIME DURATION (MIN) |
|---|---|---|
| 1  | L H H H H | 15 |
| 2  | H L H H H |    |
| 3  | H H L H H | 14 |
| 4  | L H H L H |    |
| 5  | H L H H L | 13 |
| 6  | L H L H H |    |
| 7  | L L H L H | 12 |
| 8  | H L L H L |    |
| 9  | H H L L H | 11 |
| 10 | L H H L L |    |
| 11 | L L H H L | 10 |
| 12 | L L L H H |    |
| 13 | L L L L H | 9  |
| 14 | L L L L L |    |
| 15 | H L L L L | 8  |
| 16 | H H L L L |    |
| 17 | H H H L L | 7  |
| 18 | L H H H L |    |
| 19 | L L H H H | 6  |
| 20 | H L L H H |    |
| 21 | L H L L H | 5  |
| 22 | L L H L L |    |
| 23 | L L L H L | 4  |
| 24 | H L L L H |    |
| 25 | L H L L L | 3  |
| 26 | H L H L L |    |
| 27 | L H L H L | 2  |
| 28 | H L H L H |    |
| 29 | H H L H L | 1  |
| 30 | H H H L H | .5 |
| 31 | H H H H L |    |

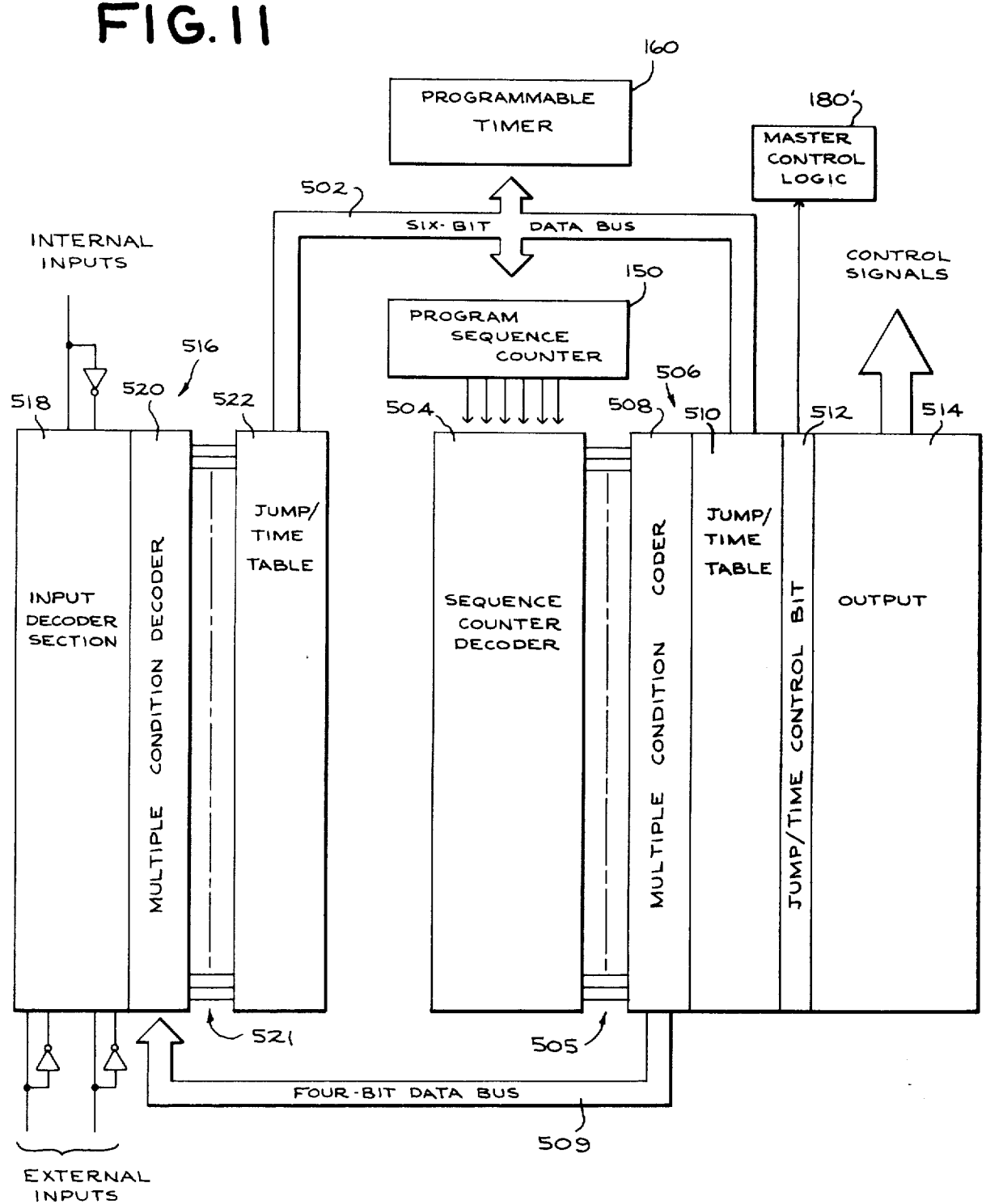

ELECTRONIC APPLIANCE CONTROLLER WITH FLEXIBLE PROGRAM AND STEP DURATION CAPABILITY

CROSS REFERENCE TO RELATED APPLICATION

Various aspects of the controller embodiment disclosed herein are the subject matter of a commonly-assigned co-pending application Ser. No. 913,260, filed June 6, 1978, by Robert J. Simcoe and Robert C. Helfrich, entitled "TIME TO GO AND DIAGNOSTIC DISPLAY FOR ELECTRONIC SEQUENCE TYPE APPLIANCE CONTROLLER."

BACKGROUND OF THE INVENTION

The present invention relates generally to an electronic sequence type controller and, more particularly, to a sequence type controller suitable for operating various types of sequentially operated apparatus, including household appliances such as clothes washing machines or the like, and which has substantial programming flexibility.

In recent years, a number of electronic control circuits for appliances, particularly dishwashers and clothes washing machines, have been proposed. Such controllers are intended to replace the electromechanical timer/sequencers which heretofore have been employed in this class of household appliances.

Such electronic controllers typically include a sequencer element in the form of a digital counter, with each counter state representing a program step. In order to advance the sequencer counter through its respective counting states, periodic clock pulses are applied to the counter. For driving various external load devices in the appliance, for example water valve solenoids, digital decoding logic is typically connected to the sequencer counter to sense the particular state thereof and to operate the external load devices when appropriate. Additionally, since different time durations are generally desired for different steps in operation cycle, a number of prior art controllers have included various means for altering the time durations of particular steps. Lastly, various controllers have included means for altering the sequence of program steps depending on external inputs.

SUMMARY OF THE INVENTION

It is a general object of the invention to provide a versatile sequence type controller generally of the class described above.

It is a more specific object of the invention to provide a general purpose electronic sequence type controller structure which may be adapted to control a wide variety of appliances and other apparatus operating in a sequential fashion through the provision of a flexible memory structure which allows the basis controller to perform a wide variety of functions with relatively simple and straightforward programming.

It is another object of the invention to provide an electronic sequence type controller having a high degree of flexibility in programming the time durations of particular steps in the program.

It is still another object of the invention to provide such an electronic controller which may be generally programmed to direct the operation of a particular apparatus such as a clothes washing machine, but which readily accepts user option inputs to vary, for a particular operating cycle, both the durations of particular steps in the cycle sequence and the sequence itself.

Briefly stated and in accordance with one aspect of the invention, these and other objects are accomplished by an electronic sequence type controller which includes a digital program sequence counter capable of stepping from one state to the next in response to inputted clock pulses, each state of the sequence counter representing a particular program step. Additionally, there is a programmable digital counter which functions to establish any one of a plurality of different time durations. The programmable timer is generally operable to count inputted clock pulses and to output a signal when the number of clock pulses corresponding to a programmed time duration have been inputted. A timer setting control is operable to program the programmable timer. A program memory is responsive to the state of the program sequence counter for directing the timer setting control to program a time duration desired for any particular program step into the programmable timer. Finally, a control logic means for directing the operation of the program sequence counter and the programmable timer to effect periodic program advancing operations is provided. Preferably, the controller includes a basic clock for producing periodic timing pulses in response to which program advancing operations occur.

In the event a signal has not been received from the programmable timer and a program step is therefore in progress, the control logic means is operable to direct a clock pulse to the programmable timer for each program advancing operation. Where a program step is completed, a signal is received from the programmable timer. The control logic means is then operable to direct a clock pulse to the program sequence counter to cause stepping to the next program step, whereupon the program memory directs the timer setting control to program a new time duration into the programmable timer.

To provide a useful output, the program memory has at least one output connection to activate an external load device during a particular program step. Additionally, the output connection may include additional logic means responsive to an external user input for further control of the output function. For example, the electronic controller may be adapted to control a washing appliance in which an external load device controls the temperature of incoming washing fluid and wherein the external user input may further condition the temperature of the incoming washing fluid.

In accordance with the flexible programming aspects of the invention, the timer setting control preferably is capable of selectively programming the programmable timer either for a time duration determined by the programming memory means, or for a time duration determined by an external input. Such a decision depends upon the particular step in the program, and the timer setting control accordingly responds to an output of the program memory means for selecting whether the program time duration is determined by the program memory means directly or by the external input.

Additionally, the program sequence counter includes the capability for selectively either stepping to the next state of a regular counting sequence, or jumping to a particular arbitrary state determined by the program memory means, again depending upon the particular program step. For additional flexibility, whether a program jump from a particular program step to another particular program step occurs may be determined by an external input.

It is contemplated by the present invention that the entire controller be constructed using large-scale integration (LSI) techniques on a single monolithic chip. A portion of the controller represents logic circuitry which is unchanged from particular application to particular application. Those portions of the controller which may be broadly categorized as memory and which vary depending upon the particular apparatus which is to be controlled and depending further upon the particular programming desired, are preferably formed as two-dimensional memory arrays which may readily be programmed with specific instructions by a suitable masking during manufacture of the chip as is known in the art of integrated circuit manufacture.

The specific embodiment which is described in detail below will be understood to be one example only of the various aspects of the invention. The particular controlled apparatus described is a domestic clothes washing machine, and particular exemplary programming suitable therefor is shown. However, it is intended that the scope of the invention be limited only by the claims appended hereto.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 6 depicts how FIGS. 6A and 6B are joined;

FIGS. 6A and 6B together comprise a detailed schematic diagram of the program sequencer portion of the electronic controller of FIG. 4, and associated control logic and program memory matrices;

FIGS. 10A and 10B together comprise a detailed schematic diagram of master control logic which directs the operation of the various elements of the electronic controller of FIG. 4; and FIG. 11 is a block diagram of an alternative controller suitable for generalized applications.

DESCRIPTION OF THE PREFERRED EMBODIMENTS

Figure 1:
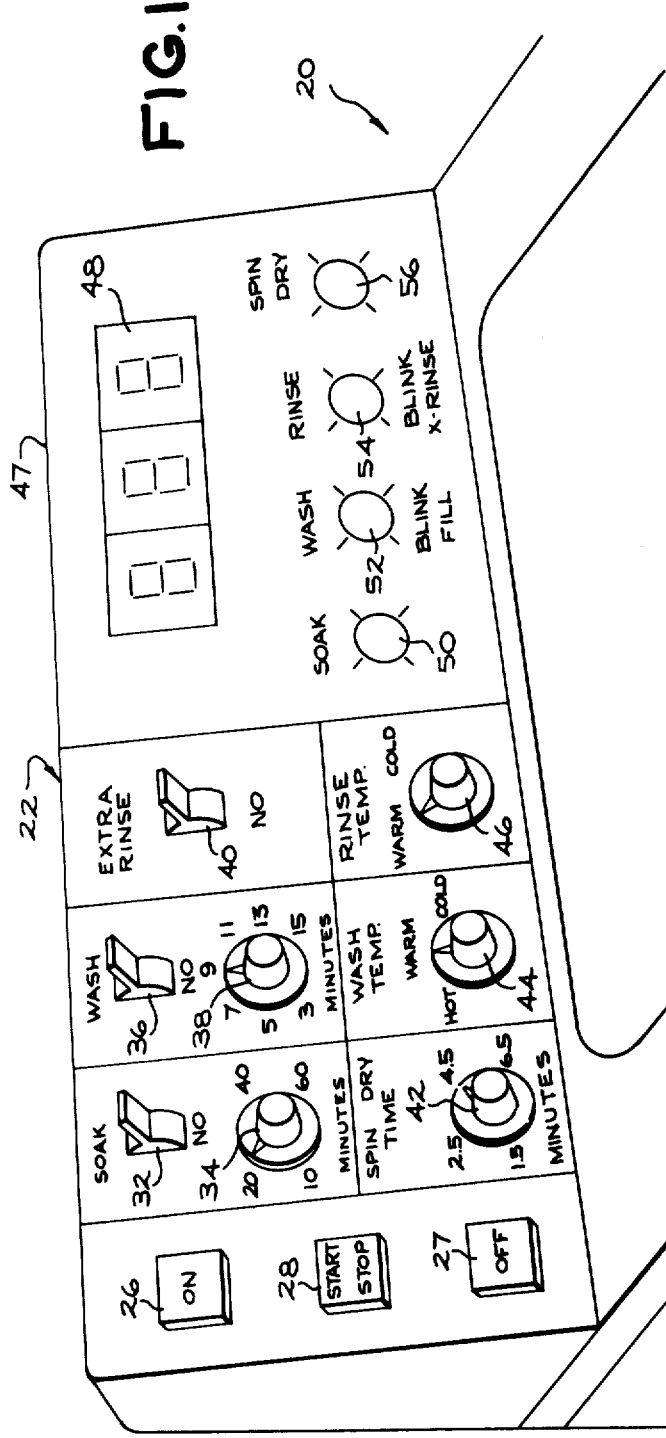
FIG. 1 is a perspective view of a portion of a clothes washing machine, illustrating various user-operable controls on the front control panel thereof.
Figure 2:
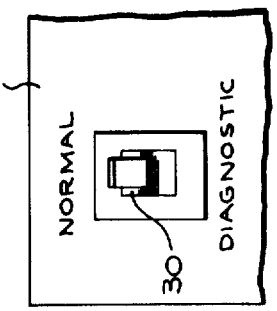
FIG. 2 is a view in elevation of a portion of the rear control panel, illustrating a switch for use by service personnel.

Referring first to FIGS. 1 and 2, a clothes washing machine 20 includes a front control panel 22 accessible by a user of the machine, and a rear control panel 24 intended for access by a service technician. From the various switches and displays on the control panel 22, together with the indicia associated therewith, the options available to the user in programming a particular washing cycle may be determined. Before considering the circuit details of the electronic controller itself, the various functions it performs, from the viewpoint of the user, will be described.

Specifically, a main power ON push switch 26 is provided to turn the entire machine 20 on. The particular power ON switch 26 employed is a mechanically latching, electrically delatching switch. To turn the machine 20 off at any time, there is an OFF pushbutton switch 27 electrically connected to delatch the ON switch 26. A START/STOP pushbutton switch 28 is provided to begin the programmed washing cycle after various cycle options have been selected. In the particular embodiment herein described, a second operation of the START/STOP switch 28 stops and resets the machine 20, if desired. Additionally, the START/STOP pushbutton switch 28 functions during a "diagnostic" mode, which may be selected by the technician, to step the machine through its programmed steps one at a time for servicing purposes. The "diagnostic" mode is enabled when a SERVICE switch 30 located on the rear panel 24 (FIG. 2) is thrown from the NORMAL to the DIAGNOSTIC position.

Before pressing the START/STOP switch 28, the user selects the cycle options by means of the various switches located generally within the six control clusters immediately to the right of the ON/OFF and START/STOP switches 26 and 28. The user cycle option selection determines in part the particular program set up within the electronic controller. Operation of a SOAK switch 32 selects whether a preliminary soaking (SOAK) subcycle is to be performed at the beginning of the washing cycle. If the preliminary soaking sybcycle is selected, operation of a SOAK time switch 34 selects the time duration thereof. As indicated, either ten, twenty, forty, or sixty minutes may be selected. Similarly, operation of a WASH switch 36 selects whether a wash subcycle is to occur, and user operation of a WASH TIME switch 38 selects the wash time duration in minutes. An EXTRA RINSE switch 40 is provided to enable selection of whether an extra rinse subcycle is to occur following the normal rinse (which is a portion of the wash subcycle). On the lower row, user operation of a SPIN DRY TIME swtich 42 selects the duration in minutes of the spin dry portion of the wash subcycle. Finally, WASH TEMPERATURE and RINSE TEMPERATURE switches 44 and 46, respectively, allow user selection of the water temperatures to be employed during the washing and rinsing portions of the cycle. As indicated, the wash temperature may be either HOT, WARM or COLD, and the rinse temperature may be either WARM or COLD.

A display portion 47 is located at the right side of the user control panel 22. The display portion 47 includes a numerical display 48 comprising three digital readouts, which are illustrated as being the seven-segment type. The numerical display 48 indicates, at the beginning of a washing cycle after the user has selected the cycle options and pressed the START/STOP switch 28, the time in minutes required to execute the particular washing cycle programmed. Thus, the user has an immediate indication of how much time will be required for the washing machine 20 to complete the particular wash cycle selected. It will be appreciated that the cycle time varies significantly depending upon which particular cycle options are selected, and depending upon the length of time selected for those cycle options having user-selectable duration. In operation, as the programmed washing cycle proceeds, the numerical display 48 continually counts down until a count of zero is reached and the wash cycle is complete. Thus during the actual execution of the programmed washing cycle, the user has a continually updated indication of how much time is remaining before the machine stops.

In addition to the numerical time indications which are of interest to the user, the numerical display 48 is also useful to a service technician when the diagnostic mode is selected by means of the SERVICE switch 30. When in the diagnostic mode, the hereinafter described electronic controller advances through the selected washing program in response to repetitive operation of the START/STOP pushbutton switch 28, rather than in response to basic clock pulses. Thus the service technician can rapidly advance the electronic controller up to a particular program step, and cause it to remain there for as long as desired. During this process, the service technician can determine from the numerical display 48 which particular program step the electronic controller is in.

Immediately below the numerical display 48, four indicator lamps are provided to inform the user what portion of the washing cycle the machine is in at any given moment. Specifically, there is a SOAK lamp 50, a WASH lamp 52, a RINSE lamp 54, and a SPIN DRY lamp 56. The WASH lamp 52 and the RINSE lamp 54 provide additional indications by blinking. The WASH lamp 52 blinks during a water filling operation, and the RINSE lamp 54 blinks during an extra rinse operation. Of course other functional display lamps could also be provided.

In connection with the presoak, wash, and rinse subcycles, the clothes washing machine 20 includes an additive dispensing system similar to that disclosed in U.S. Pat. No. 3,727,434-Bochan, the entire disclosure of which is hereby incorporated by reference. The Bochan patent discloses a system for sequentially dispensing a plurality of treating agents into the wash tub of an automatic washing machine at predetermined times during the washing cycle. The additives may be a prewash additive for the presoak operation, a soap or detergent and a bleach for the wash operation, and a rinsing agent for the rinse operation. The Bochan dispenser includes a plurality of compartments for storing the treating agents to be dispensed. In the particular dispenser there disclosed, a mechanically-operated water supply device is sequentially controlled to selectively direct water into the compartments to flush the agents into the wash tub at predetermined times. It will be apparent, however, that the mechanical linkage there disclosed may be replaced by a suitable electromechanical means employing solenoids. Therefore, a similar dispensing system which receives its instructions from an electronic controller may be constructed, and such an electromechanical dispensing system is included in the present clothes washing machine 20.

CONTROLLER INFERFACING

Figure 3:
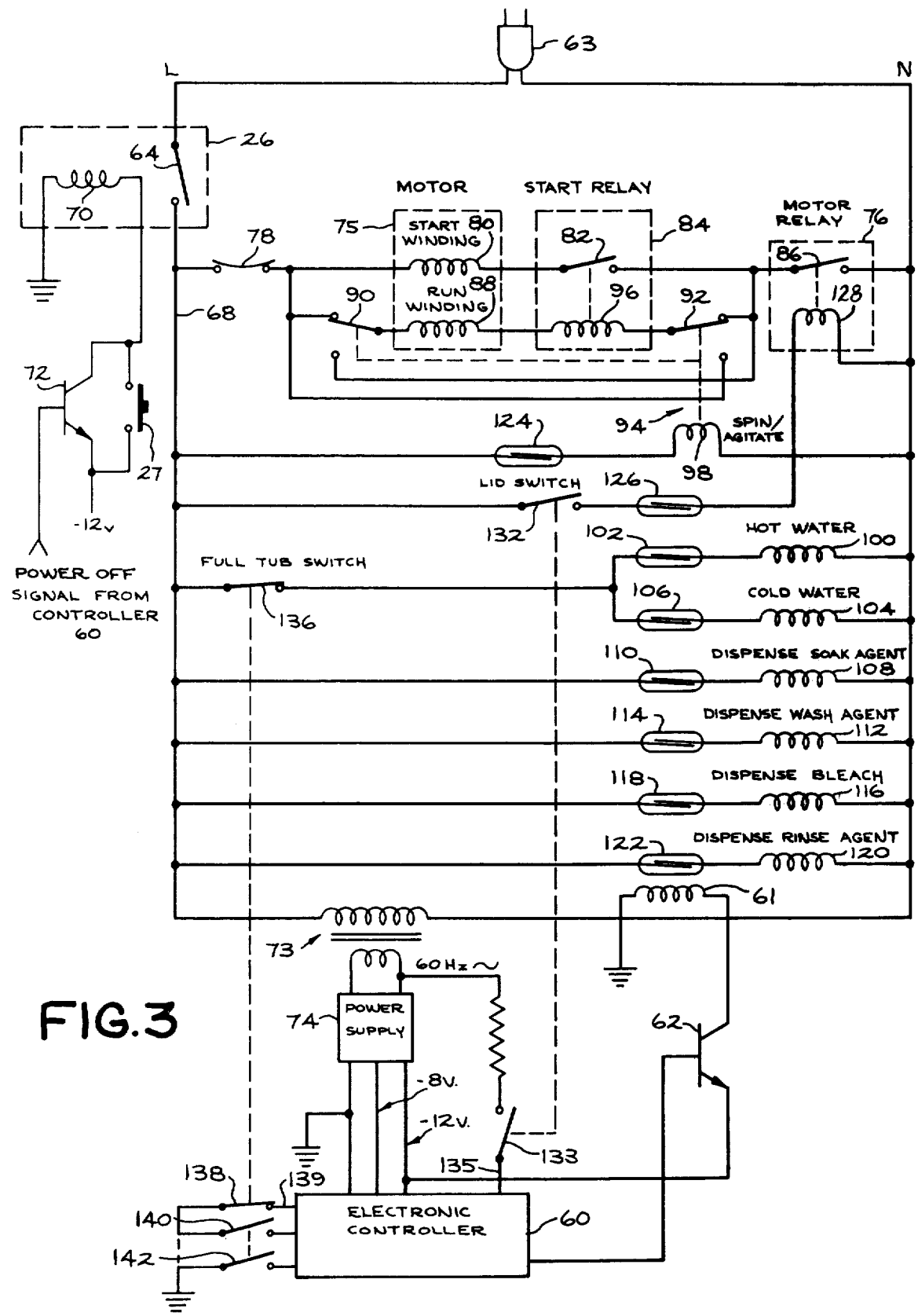
FIG. 3 is an electrical circuit diagram of the interface between various mechanical elements of the clothes washing machine and the electronic controller described herein.

Referring now to FIG. 3, an electrical circuit diagram shows the interfacing between various mechanical and electromechanical elements of the washer 20 and an electronic controller 60. These various elements of the washer 20 include both output devices such as relays, solenoids, and indicator lamps, actuated by the controller 60, and controller input devices in the form of switches. Preferably, the electronic controller 60 is a single large-scale integrated circuit including a relatively large number of electronic circuit elements on a single semiconductor chip.

In FIG. 3, for clarity of illustration, only the electromagnet portions of the various water valve and additive dispensing solenoids are shown. It will be appreciated that the various solenoids and relays are relatively high current load devices compared to the output capabilities of the electronic controller 60. Accordingly, intermediate load switching devices are employed for interfacing. In the illustrated embodiment, these intermediate load switching devices are reed relays. Each of the illustrated reed relay contacts has associated with it a corresponding coil, for example representative coil 61 which is connected by means of a representative NPN driver transistor 62 to an output of the electronic controller 60. Alternatively, the load switching devices may comprise solid state switching elements such as triacs.

In FIG. 3, a power plug 63 is provided for connection to a standard household electrical circuit. Voltage is thereby supplied across conductors L and N. The L conductor is connected through a contact 64 of the ON push switch 26 to supply a conductor 68. Upon user operation of the switch 26, the contact 64 closes. At the end of a washing cycle, the release coil 70 of the latching switch 26 is energized by a signal from the controller 60, suitably interfaced through a driver transistor 72. This opens the contact 64 to shut off the machine. Additionally, the OFF pushbutton switch 27 is connected across the collector and emitter terminals of the driver transistor 72. Thus, the transistor 72 may be manually bypassed at any time to energize the release coil 70 and shut off power to the machine 20.

To supply low voltage DC to the electronic controller 60, a step down transformer 73 is connected across the conductors 68 and N. A conventional low voltage DC power supply 74 connected to the secondary of the transformer 73 supplies the required voltages to the electronic controller 60.

The washing machine 20 includes an electric motor 75 which is energized from the L and N conductors when the switch contact 64 is closed and a motor relay 76 is energized. Specifically, a circuit is completed from the conductor 68, through a circuit breaker 78, the start winding 80 of the motor 75, the contacts 82 of a start relay 84, and the contacts 86 of the motor relay 76, to the N conductor. The motor run winding 88 is connected between the circuit breaker 78 and the motor relay 76 through motor-reversing relay contacts 90 and 92, which are the contacts of a spin/agitate relay 94. The coil 96 of the motor start relay 84 is connected in series with the motor run winding 88 so that the relatively high starting current for the run winding 88 causes the starting contacts 82 to close and energize the start winding 80 until such time as the motor 74 comes up to speed.

When the coil 98 of the spin/agitate relay 94 is energized, the motor reversing relay contacts 90 and 92 reverse the relative phasing of the start winding 80 and the run winding 88. This effects control of motor rotation direction. A mechanical transmission (not shown), conventional in clothes washing machines, is responsive to the direction of motor rotation either to cause the agitator and basket (not shown) to rotate continuously together at relatively high speed for a spin operation when the motor 75 is rotating in one direction, or to cause the agitator to move with rotary reciprocating action when the motor 75 is rotating in the other direction. Specifically, when the coil 98 is not energized and the contacts 90 and 92 are in the position shown, the motor 75 rotates in the direction for agitation; when the coil 98 is energized, the contacts 90 and 92 reverse the relative phasing of the motor windings and the motor rotates in the direction for spin.

The various electromagnetic solenoids in the washing machine 20 and their corresponding reed relay contacts are a hot water valve solenoid 100 and a corresponding contact 102, a cold water valve solenoid 104 and a contact 106, a "dispense soak agent" solenoid 108 and a contact 110, a "dispense wash agent" solenoid 112, and a reed relay contact 114, a "dispense bleach" solenoid 116 and a contact 118, and finally a "dispense rinse agent" solenoid 120 and relay contact 122. Although not shown, it will be appreciated that coils, such as the representative coil 61 for the contact 122, operate each of the above-mentioned reed relay contacts. Similarly, reed relay contacts 124 and 126 are connected to energize the spin/agitate relay coil 98 and the motor relay coil 128, respectively.

In addition to the washing machine load devices energized by the electronic controller 60, several representative inputs to the electronic controller 60 are shown in FIG. 3. Specifically, there is a lid switch having two contacts 132 and 133 which close when the machine lid 134 (FIG. 1) is closed. To prevent operation of the motor 75 unless the lid 134 is closed, the contact 132 is connected in series with the motor relay coil 128. To interrupt a low voltage sixty Hz AC timing signal from which the controller 60 derives its basic clock pulses, the contact 133 is connected in series between a low voltage AC source and a controller input line 135.

Similarly, a "full tub" switch has a pair of contacts 136 and 138. The first contact 136 of the full tub switch interrupts current supplied to the hot and cold water valve solenoids 100 and 104 when the tub is full, and the second contact 138 supplies a signal to a controller input line 139 to indicate the tub is full.

The two remaining switch contacts 140 and 142 illustrated are representative of various contacts associated with the user-operable controls which were discussed above with reference to FIGS. 1 and 2.

GENERAL INTERNAL ARRANGEMENT OF THE ELECTRONIC CONTROLLER 60

Figure 4:
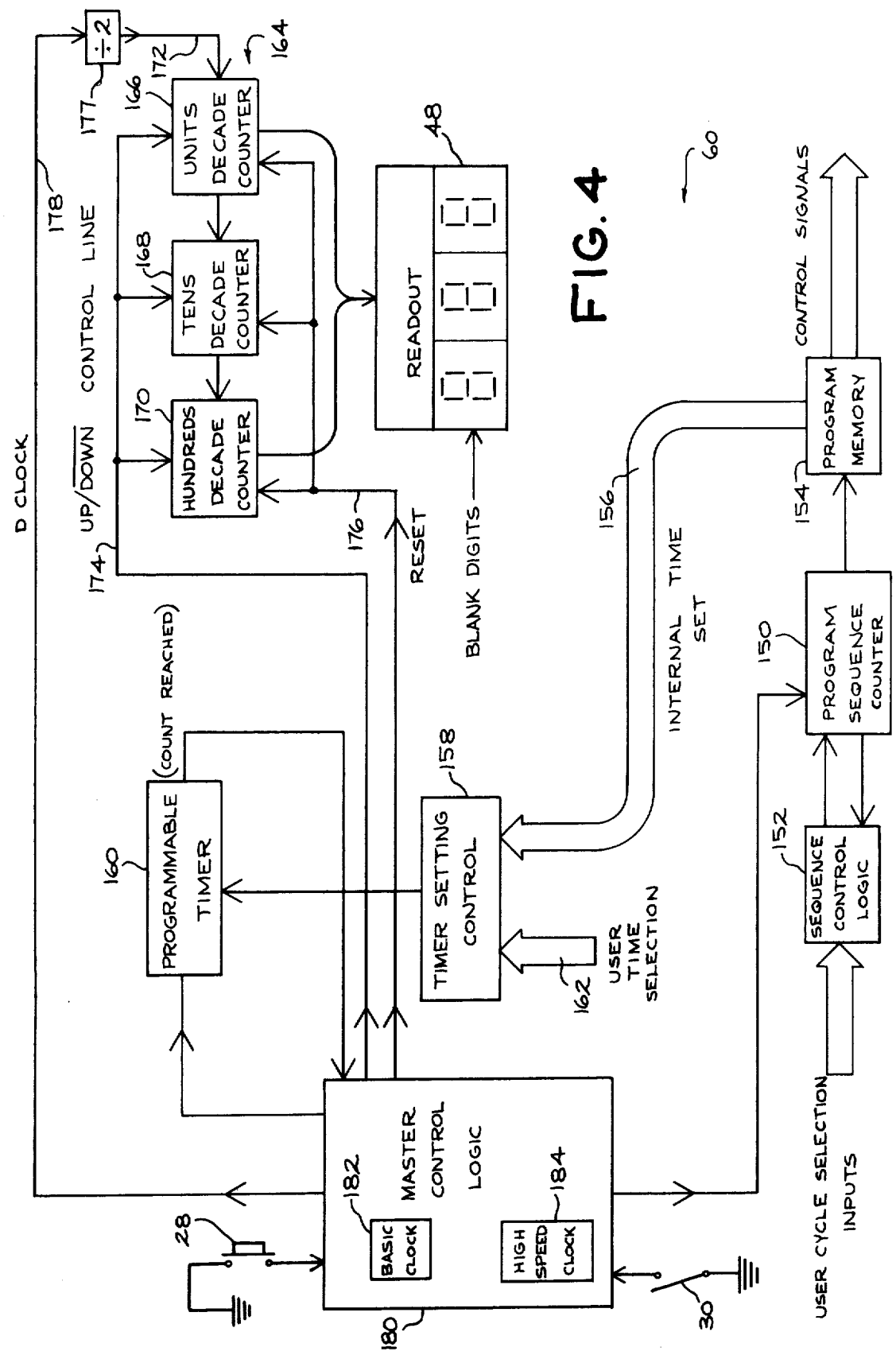
FIG. 4 is an overall block diagram of the electronic controller embodying the present invention.

Referring now to FIG. 4, there is shown an overall functional block diagram of the electronic controller 60. For convenience, the numerical display 48 (FIG. 1) is included in the block diagram of FIG. 4, although it will be appreciated that the display 48 is not a part of the electronic controller 60 itself, but rather is connected to an output thereof.

Generally speaking, the controller 60 is a sequence type controller which advances the washing machine 20 through a series of individual steps. The frequency at which program advancing operations occur depends upon the particular mode the controller 60 is in. For example, during the "run" mode, a program advancing operation occurs in response to each basic clock pulse, basic clock pulses occurring at thirty-second intervals. The precise sequence of steps and the duration of individual operations is determined in part by the programming of the controller during manufacture, and in part by user cycle selections at the beginning of each washing cycle.

The controller 60 includes a program sequencer 150 which is essentially a digital counter. The program sequencer counter 150 proceeds through its various states in response to inputted clock pulses, either sequentially step-by-step or in jumps, depending upon the particular washing cycle options selected and the particular point in the washing cycle.

Control over the operation of the program sequencer 150 is generally accomplished by sequence control logic 152 which is connected both to receive various user cycle selection inputs and to receive, from the program sequencer counter 150, information indicating the state of the counter 150, each counter state corresponding to a particular program step.

The program sequencer 150 also has outputs connected to a program memory 154 which decodes information indicating the state of the program sequencer counter 150 to provide suitable output control signals to operate the various load devices of FIG. 4. The program memory 154 additionally sends signals along an internal time set signal path 156 to a timer setting control 158.

Exemplary circuitry for and the operation of the program sequencer 150, the sequence control logic 152, and the program memory 154 are described hereinafter with particular reference to FIGS. 5, 6A and 6B.

To determine the duration of particular operations in the exemplary washing cycle, a programmable timer 160 is provided. The programmable timer 160 also is essentially a digital counter, and is connected to receive instructions from the timer setting control 158. It will be appreciated that the duration of many of the particular operations which comprise a complete wash cycle is much greater than the interval between successive basic clock pulses, which interval is thirty seconds in the embodiment herein described.

The function of the programmable timer 160 is to accumulate clock pulses until a predetermined count is reached. During "run" mode operation, a clock pulse for the programmable timer 160 occurs for each program advancing operation. The predetermined count is determined by the timer setting control 158, which receives input both via the signal path 156 from the program memory 154 and via a signal path 162 from the various user time selection switches, for example the SOAK TIME switch 34 (FIG. 1).

The controller 60 also has, associated with the numerical display 48, an up/down digital counter 164. The counter 164 comprises conventional units, tens, and hundreds decade counters 166, 168, and 170, respectively. The counter 164 has three input lines, a clock pulse input line 172, an UP/$\overline{\text{DOWN}}$ control input line 174, and a RESET input line 176. In operation, the counter 164 counts either up or down in response to inputted clock pulses along the line 172, the direction of counting being determined by a signal on the UP/-DOWN line 174. The counter 164 resets to a zero state when a signal is received along the RESET line 176.

Outputs indicating the state of the digital counter 164 are connected in conventional fashion to drive the numerical display 48.

In the particular embodiment herein described, the numerical display 48 indicates time to go in minutes. However, the interval between basic clock pulses employed in the controller 60 is thirty seconds. Therefore, a divide-by-two or binary element 177 is interposed between a D CLOCK line 178 and the actual counter clock pulse input line 172, a D CLOCK pulse occurring for each program advancing operation during "run" mode operation. The binary element 177 may comprise, for example, either a J-K type flip-flop, or a D-type flip-flop, suitably connected.

The last element in the overall functional block diagram of FIG. 4 is a master control logic 180. The master control logic 180 is described in detail below with reference to FIGS. 10A and 10B. At this point in the description it is sufficient to state that the master control logic 180 includes a basic clock 182 for producing basic clock pulses, and a high speed clock 184 for producing high speed clock pulses relative to the frequency of the basic clock pulses. Additionally, the master control logic 180 includes means for suitable interconnection with the outer elements of the controller 60 to direct the proper operation thereof. These interconnections are indicated in a general way by lines with arrows. From FIG. 4 it can be seen that inputs to the master control logic 180 include connections from the START/STOP pushbutton switch 28 and the SERVICE switch 30.

GENERAL OPERATION OF THE CONTROLLER 60

Referring, in addition to the block diagram of FIG. 4, to the program sequence chart of FIG. 5, the overall operation of the electronic controller 60 will now be described. FIG. 5 depicts a particular wash program which is for purposes of example only. It will be appreciated that many programs are possible and may be programmed into the controller 60. Although in actual operation the controller 60 operates first in a "compute" mode and then in a "run" mode, its operation will be best understood from a description first of the "run" mode.

At the beginning of the "run" mode, the program sequencer counter 150 has a state corresponding to Step No. 2 (FIG. 5), the up/down digital counter 164 has a state corresponding to (and the display 48 is indicating) the time in minutes which will be required to execute the selected program, and the controller 60 is enabled to perform program advancing operations in response to the basic clock pulses occurring at thirty-second intervals.

Since the duration of Step No. 2 is zero, the program sequencer 150 is immediately incremented to Step No. 3, whereupon the program memory 154 sends appropriate control signals to the hot and cold water valve solenoids 100 and 104 (FIG. 3) to cause filling of the wash tub. Since the time for water filling operation is indefinite, depending upon external factors such as water pressure, a filling operation is considered a special circumstance. A definite time for a filling operation is not programmed and the numerical display 48 remains unchanged during the operation. However, as a safety override in the event that water is not entering the tub for some reason, the programmable timer 160 is programmed, via the internal time set path 156, for fifteen minutes. (Specifically, the programmable timer 160 is programmed to count thirty-one clock pulses, and to output a COUNT REACHED signal immediately upon the reaching of the thirty-first count.)

When the tub is full, the full tub switch second contact 138 (FIG. 3) closes, whereupon the master control logic 180 steps the program sequencer 150 to Step No. 4.

Figure 5:
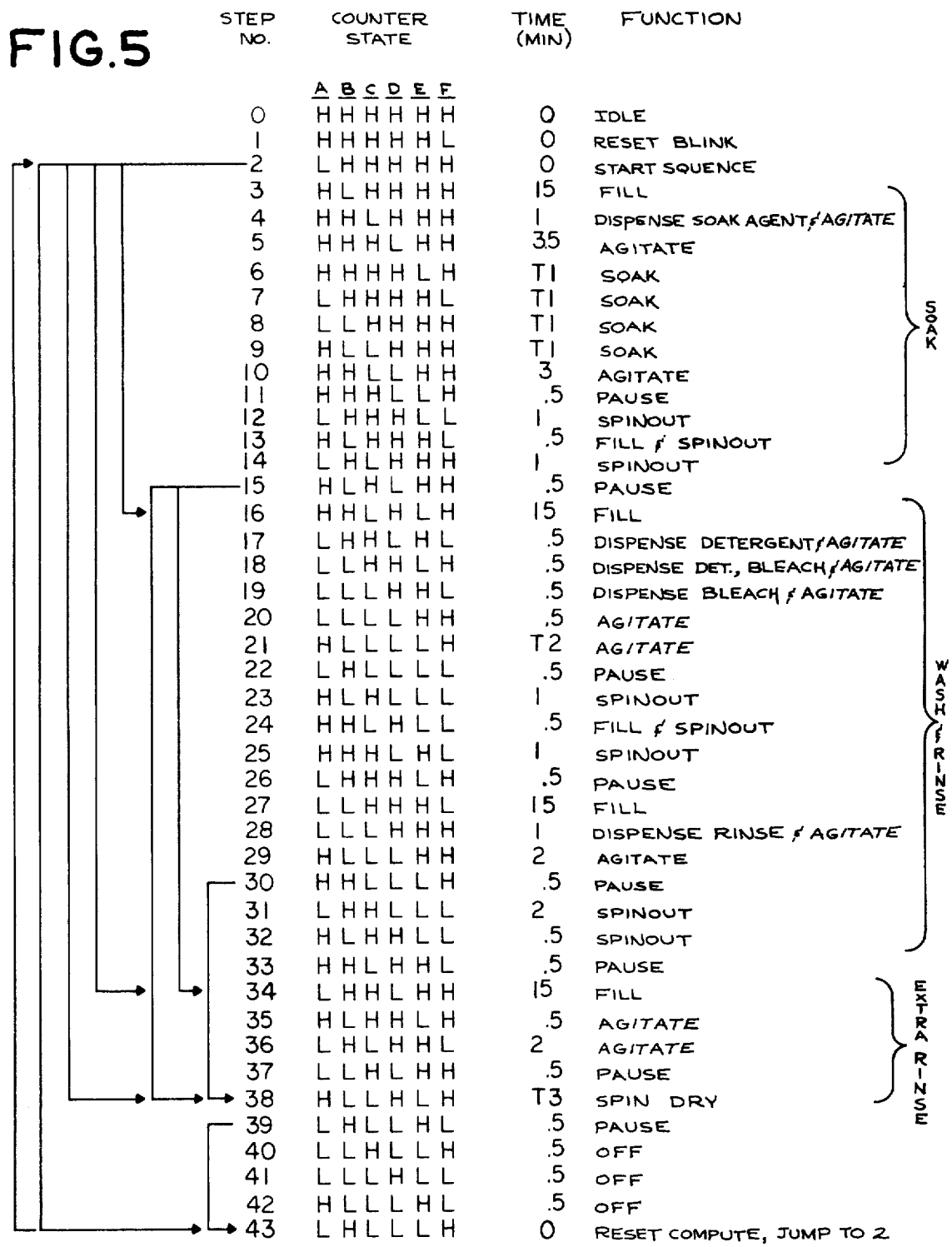
FIG. 5 is a program sequence chart outlining functional steps through which the electronic controller of FIG. 4, and particularly the program sequencer portion thereof, directs the clothes washing machine.

As can be seen from FIG. 5, during Step No. 4 a soak agent is dispensed and the agitator operates. These two functions are accomplished by appropriate control signals emanating from the program memory 154 to the "dispense soak agent" solenoid 108 and the motor relay coil 28. For agitation, the spin/agitate relay coil 98 is not energized. From FIG. 5, it can also be seen that the duration of Step No. 4 is one minute. Since a basic clock pulse occurs every thirty seconds, the programmable timer 160 is set by the timer setting control 158 to count two clock pulses, and then to output a COUNT REACHED signal. Two program advancing operations are thus required. For this particular step, the duration is internally selected by means of a signal from the program memory 154 along the path 156 to the timer setting control 158.

At the end of the one minute duration of Step No. 4, the master control logic 180 steps the program sequencer 150 to Step No. 5. It can be seen from FIG. 5 that Step No. 5 has an assigned duration of 3.5 minutes and it is an agitate operation. Accordingly, the program memory 154 sends appropriate signals to de-energize the previously energized soak agent solenoid 108, but maintains the motor relay 76 energized. Additionally, the program memory 154 sends an "internal time set" signal along the path 156 to set the programmable timer 160 to count seven clock pulses before outputting a COUNT REACHED signal, thereby to establish the desired 3.5 minute time duration. When the count is reached, the programmable timer outputs its COUNT REACHED signal, whereupon the master control logic 180 again steps the program sequencer 150.

At this point, the program sequencer 150 is in the state corresponding to Step No. 6. Step No. 6 is a soak operation, in which the machine 20 stands idle with the tub full for a predetermined length of time. The soak step differs from previously described Steps Nos. 4 and 5 in that the time duration thereof is selected by the user, rather than being an internally selected time. This user time selection is accomplished by a direct input from the contacts of the soak select switch 34 (FIG. 1) along the path 162 to the timer setting control 158.

It can be seen from FIG. 5 that there are four "soak" steps; namely, Step Nos. 6, 7, 8 and 9. Because the duration of a soak operation is relatively long compared to other operations, a design and programming compromise was made. Rather than employing a programmable timer having additional stages so as to be capable of counting to the relatively high number which otherwise would be required, four successive program steps are used for this operation. Specifically, the programmable timer 160 is capable of counting to thirty-one, which corresponds to a time interval of 15 minutes. Yet a soak duration of up to sixty minutes may be selected using four successive program steps. The saving in counter hardware necessitates additional program memory.

As the cycle continues, the controller 60 proceeds through the program outlined in FIG. 5 in the manner generally discussed above. However, an exception relates to the various programp jumps indicated by the arrows in the left hand column of the FIG. 5 program sequence chart. The arrows indicate that a jump from a particular step to a particular step can occur if appropriate. Whether a particular program jump actually occurs is determined by means of external user cycle selection inputs to the sequence control logic 152. The specific user cycle selection inputs operable in the particular embodiment herein disclosed are SOAK, WASH and EXTRA RINSE.

For example, if SOAK has not been selected, then at program Step No. 2, the sequence control logic 152 would cause the program sequencer 150 to immediately jump either to Step No. 16 to begin a normal wash and rinse operation, to step No. 34 to begin an extra rinse operation, or to Step No. 38 to begin a spin dry operation, depending on whether WASH and EXTRA RINSE are selected.

To summarize the above, a clock pulse for the programmable timer 160 is generated during each program advancing operation, program advancing operations occurring in response to basic thirty-second clock pulses. These clock pulses are counted or accumulated by the programmable timer 160 until the specific programmed count is reached, thus establishing the program step time duration. The programmable timer 160 then outputs a COUNT REACHED signal to the master control logic 180, which then steps the program sequencer 150. In response to each new state of the program sequencer counter 150, new control signals and timer setting control signals emerge from the program memory 154. For the case of program Step Numbers (FIG. 5) with an assigned duration of zero minutes, the program sequencer 150 is rapidly stepped through a plurality of program Step Numbers during each program advancing operation. It will be apparent therefore that a definite and predetermined number of basic clock pulses are required for the controller 60 to proceed through the entire program.

The operation of the up/down digital counter 164 and the numerical display 48 associated therewith while all this is going on will now be discussed. As mentioned above, at the beginning of the "run" mode the digital counter 164 is preset with a state corresponding to the time in minutes which will be required to execute the particular wash program selected. Additionally, the UP/$\overline{\text{DOWN}}$ control line 174 carries a signal appropriate to cause the digital timer 164 to count down. At the same time the master control logic 180 supplies thirty-second interval clock pulses to be counted by the programmable timer 160, it also supplies clock pulses along the D CLOCK line 178 to the up/down digital counter 164. One D CLOCK pulse is supplied for each program advancing operation in direct response to each basic clock pulse. The binary element 177 interposed between the D CLOCK line 178 and the counter 164 produces an output pulse every one minute on the line 172, since the display 48 of the particular embodiment illustrated is in minutes.

As the program execution proceeds during the "run" mode, the numerical readout 48, indicating the state of the up/down digital counter 164, provides a continuous indication of the time remaining in the execution of the particular program selected. The digital counter 164 reaches its zero state at the same time the program sequencer counter 150 reaches the end of the selected program, which is Step No. 40 of FIG. 5.

Operation of the controller 60 during the "compute" mode, which precedes the "run" mode, will now be described. It is during the "compute" mode that the digital counter 164, and thus the numerical display 48, receives its initial count corresponding to the number of minutes required to execute the selected program.

When the washing machine 20 is initially energized by means of the ON/OFF switch 26, "power on reset" circuitry (FIG. 10A) in the master control logic 180 initializes the program sequencer 150 in Step No. 0 for an idle condition, presets the up/down digital counter 164 to a count of zero, and enables a blink mode for the lamps comprising the display 48. At this time the user selects cycle option by entering the optional user cycle selections and the user time selections. The "power on reset" circuitry additionally enables the controller "compute" mode.

When the START switch 28 is pushed, the program sequencer counter 150 is set to Step No. 1 (FIG. 5), which is the beginning of actual program execution. In Step No. 1, the blink mode for the display 48 is disabled. Since the time duration for Step No. 1 is zero, the program sequencer 150 remains in Step No. 1 only momentarily before stepping to Step No. 2.

A significant difference between operation during the "compute" mode and operation during the previously-described "run" mode is that, during the "compute" mode program advancing operations do not occur in response to pulses from the basic clock 182. Instead, program advancing operations occur in rapid repetition generally in response to pulses produced by the high speed clock 184. The frequency of the high speed clock 184 is in the order of 200 KHz and, in the particular controller embodiment herein described, program advancing operations occur with approximately one-sixth that frequency. An additional difference is that the up/down counter 164 is enabled to count up, rather than down as during the "run" mode. A similarity of "compute" mode operation to "run" mode operation is that clock pulses for the programmable time 160 and D CLOCK pulses for the display counter 164 occur just the same during each program advancing operation. During the "compute" mode, the entire selected program thus executes at an extremely fast rate. To the user, this initial execution of the selected program appears almost instantaneous.

Considering specifically the up/down display counter 164 and its associated numerical readout 48, since the counter 164 starts from zero at the beginning of "compute" operation and is enabled to count up, at the time program Step No. 39 is reached (FIG. 5), the counter 164 has accumulated a count equal to the number of minutes required to execute the program.

To end the "compute" mode, the program sequencer 150 jumps from Step No. 39 to Step No. 43 (FIG. 5). In Step No. 43, the "compute" mode is disabled, and the "run" mode is enabled. The program sequencer 150 remains only momentarily in Step No. 43, before jumping back to Step No. 2. "Run" mode operation then proceeds in the manner previously described.

During the "compute" mode, to prevent operation of the various solenoids in the washing machine 20, control signals from the program memory 154 are disabled. However, since the program executes so rapidly during the "compute" mode, even if disabling were not done, the various electromechanical components, for the most part, would have insufficient time to respond.

DIAGNOSTIC FEATURE

When the "diagnostic" mode is enabled by operation of the SERVICE switch 30 on the panel rear 24, neither pulses from the basic clock 182 nor pulses from the high speed clock 184 are employed to step the controller 60 through the selected program. Rather, pulses produced by repetitive operation of the START/STOP pushbutton switch 28 are employed. A service technician may, therefore, cause the program sequencer 150 to step quickly through a selected program until a desired step is reached. In the particular embodiment herein described, the programmable timer 160 is not used during the "diagnostic" mode.

When a desired step is reached, the technician no longer operates the START/STOP pushbutton switch 28, and the program sequencer counter 150 remains in whatever state it happens to be in.

Fairly rapid access to any particular step in the program is thereby provided. Further, once a particular program step is reached, the program sequencer 150 remains in that state corresponding to that step for as long as may be desired. These capabilities are quite useful for checking out the operation of the various elements, particularly the electromechanical components, of the washer 20.

To provide information useful to the service technician, during the "diagnostic" mode, the up/down digital counter 164 is enabled to count up, and the numerical display 48 merely indicates program steps. Since, in the particular embodiment illustrated, the binary 177 is interposed between the D CLOCK line 178 and the clock input line 172 of the counter 164, the master control Logic 180 outputs two successive pulses on the D CLOCK line for every operation of the START/STOP switch 28.

DETAILED CIRCUIT DESCRIPTION

Exemplary circuit details for the various blocks in the FIG. 4 block diagram will now be described. It will be appreciated that the description herein is intended only to illustrate one particular electronic controller scheme for a particular appliance, namely the washing machine 20, and is not intended to limit the scope of the claimed invention. The description below covers all the blocks of FIG. 4, with the exception of the up/down digital counter 164 comprising the decade counting units 166, 168, and 170, and with the further exception of the numerical readout 48. Digital counters and readouts are commercially widely available, and a detailed description thereof is not believed necessary to a full understanding of a manner of practicing the invention.

The controller 60 herein disclosed is described in terms of an implementation employing a large number of CMOS integrated circuit logic devices. The particular design described is adapted for implementation as a single large scale integrated circuit using PMOS fabrication technology.

Various memory matrices or arrays are described hereinafter, and exemplary circuits therefor, which model PMOS logic structures, are described. It will be appreciated however, that many internal memory structures are possible. Further, it will be appreciated that the particular programming described herein is illustrative only, intended to accomplish particular functions in a particular machine, and may vary as desired to accomplish other functions for other machines.

The particular logic symbols and sign conventions employed herein are intended to minimize any confusion which possibly could result in describing a circuit which may be implemented employing either CMOS (a "positive logic" family) or PMOS (a "negative logic" family).

CD4000 series COS/MOS digital integrated circuits manufactured by the RCA Corporation have been found suitable for providing the logic functions in the circuitry described herein. Specifically, the NOR gates and the low activated AND gates may be those included in integrated circuit type Nos. CD4001A, CD4025A, or CD4002A, depending upon whether two, three, or four inputs are required. The inverters may be those included in type No. CD4009A.

An additional frequently employed logic circuit element is a data-type (D-type) flip-flop. An integrated circuit type CD4013A may be employed.

DESCRIPTION OF THE PROGRAM SEQUENCER 150 AND ASSOCIATED ELEMENTS

Figure 6B:
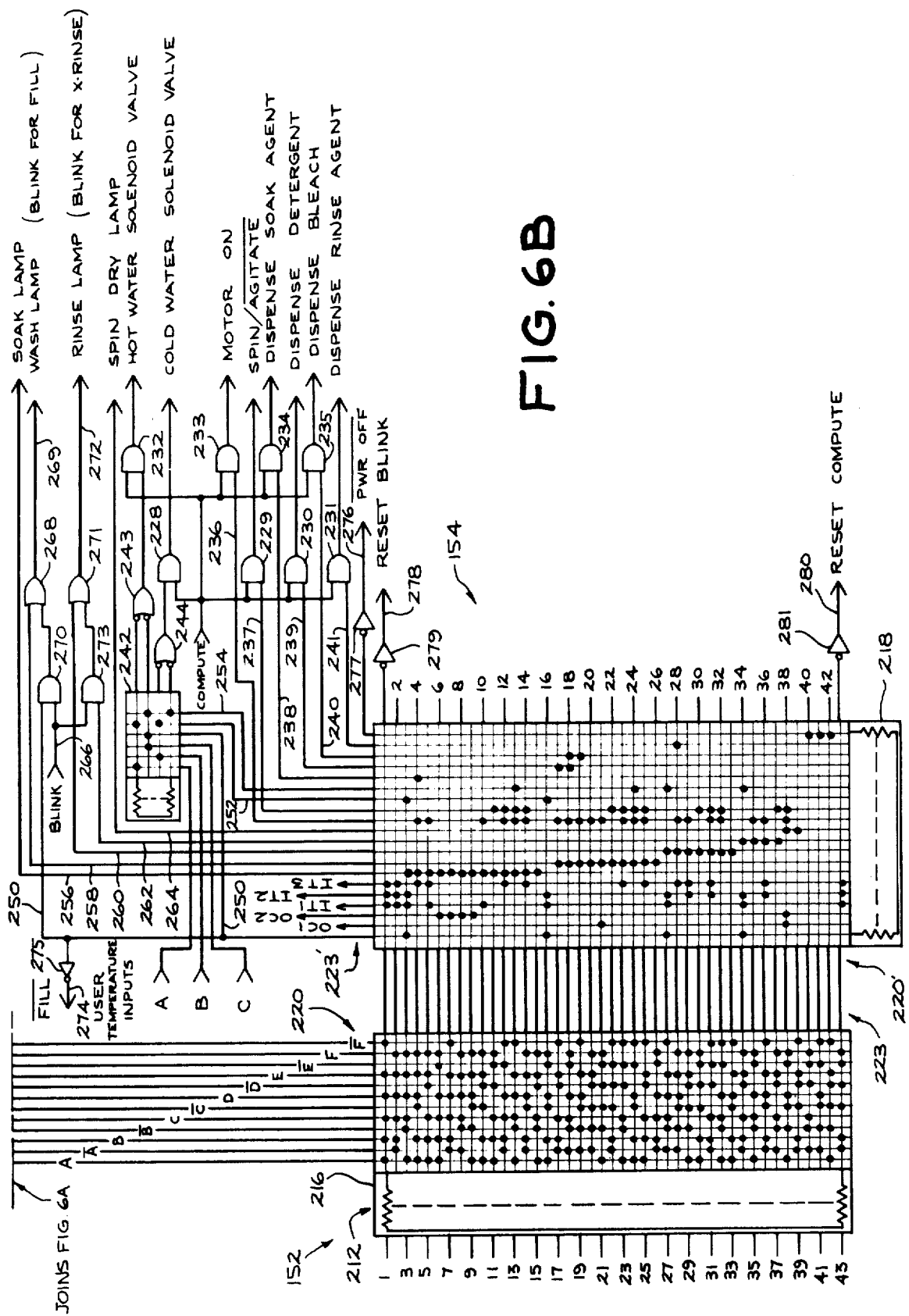

Referring now to FIGS. 6A and 6B, there is shown a detailed schematic diagram of the program sequencer counter 150, the sequence control logic 152, and the program memory 154 which are shown in block diagram form in FIG. 4.

In FIG. 6A, the program sequencer counter 150 is a six-stage digital counter. The individual counter stages are designated A, B, C, D, E, and F. Each stage comprises a D-type flip-flop. The flip-flops are generally serially connected in recirculating shift register fashion. To produce sequential counting operation instead of mere recirculation, the Q outputs (also designated E and F) of the E and F flip-flops are connected to the inputs of an EXCLUSIVE NOR gate 190. The EXCLUSIVE NOR gate 190 may comprise an RCA type No. CD4030A EXCLUSIVE OR gate followed by an inverter. The output of the EXCLUSIVE NOR gate 190 is fed back to the input of the A counter stage.

A particular feature of the program sequencer counter 150 is that it is capable of either counting step-by-step through its sequence in response to inputted clock pulses, or of being preset to a particular state upon receipt of a clock pulse. So that either of these functions may be accomplished, the input of each of the six counter stages comprises and AND-OR select gate. Each AND-OR select gate comprises two 2-input AND gates driving a single 2-input OR gate. An RCA type No. CD4019A AND-OR select gate may be employed. The function of an AND-OR select gate is to take the input signal applied to its selected side and to present this signal at its output. The AND-OR select gate 191 for the first, or A, counter stage is representative and comprises upper and lower AND gates 192 and 194, and an OR gate 196, the output of the OR gate 196 being connected to the data (D) input of the A flip-flop.

In connection with the AND-OR select gates, an "enable count" line 198 and an "enable preset" line 199 are associated with the counter 150. The "enable count" line 198 is connected to the lower input of each of the lower AND gates, such as the representative lower AND gate 194, and the "enable preset" line 199 is connected to the lower input of each of the upper AND gates, such as the representative upper AND gate 192. An inverter 200 drives the "enable count" line 198 from the "enable preset" line 199, and the "enable preset" line 199 is supplied by a "jump to" memory matrix 201.

For counting step-by-step in sequence, the upper input of each of the lower AND gates is connected to the Q output of the preceding flip-flop. An exception is the upper of the lower AND gate 194 for the A counter stage, which input is connected to the output of the EXCLUSIVE NOR gate 190. For presetting the sequencer counter 150, the upper input of each of the upper AND gates is connected to one of the output lines of the "jump to" memory matrix 201. Finally, an SC CLOCK input line 202 is connected to the clock (C) inputs of the flip-flops.

In operation, when a logic "high" appears on the "enable count" line 198, the low AND gates are enabled to permit whatever signal appears on the upper input of each lower AND to be presented to the corresponding OR gate, and thence to the D input of the corresponding flip-flop. Each flip-flop Q output is thus in effect connected to the D input of the succeeding flip-flop. This produces the usual shift register configuration. As clock pulses are received along the SC CLOCK input line 202, logic levels are shifted from one flip-flop to the next.

Conversely, when a logic "high" appears on the "enable preset" line 199, the upper AND gates are enabled. In this condition, each flip-flop stage receives its input condition from one of the output lines of the "jump to" memory matrix 201.

Two additional inputs to the program sequencer counter 150 are a RESET line 208 and a START SC line 210. The idle condition of the counter 150 is defined as all flip-flop stages being in the logic "high" condition. Therefore, the RESET line 208 is connected to the set (S) input of each flip-flop. A logic "high" on the RESET line 208 sets the counter 150 to a state of all "highs". For the first step (FIG. 5) in the counting sequence, the counter condition is defined as all "highs" except for a "low" in the last or F stage. To force the last or F flip-flop stage to "low" when a logic "high" appears on the START SC line 210, the START SC line 210 is connected to the "reset" (R) input of the F flip-flop.

The particular counting sequence of the program sequencer 150 during the step-by-step mode may best be understood with reference to the program sequence chart of FIG. 5, particularly the "counter state" column thereof, in addition to FIGS. 6A and 6B. Initially, when the RESET line 208 goes "high," the Q outputs of the counter stages A, B, C, D, E and F are set to "high." As a result, the counter 150 remains in the idle state regardless of any clock pulses appearing on the SC CLOCK line 202. This counter state is represented in FIG. 5 as "HHHHHH."

To start the counting sequence, a logic "high" appears on the START SC line 210. As indicated in FIG. 5, Step No. 1, counter stage F is then in the logic "low" state, and the remaining stages are in the logic "high" state. In Step No. 1, since the two inputs of the EXCLUSIVE NOR gate 190 are different, it is activated and its output, fed back to the first or A stage, is "low."

Assuming the "enable count" line 198 is "high," during the next five SC CLOCK pulses the logic "low" initially in the F counter stage simply shifts around, as indicated in FIG. 5, successively to the A, B, C, D and E counter stages, whereupon the sequence counter 150 is in Step No. 6. In Step No. 6, the Q output of the counter stage E has a logic "low" and the Q output of the counter stage F has a logic "high." The EXCLUSIVE NOR gate 190 is again activated and a logic "low" is fed back and applied to the D input of the A flip-flop, ready to be transferred to the Q output of the A flip-flop upon receipt of the next SC CLOCK pulse.

Upon actual receipt of the next SC CLOCK pulse, the A counter stage goes to "low." The original "low" has been clocked all the way back to the F counter stage. This counter state corresponds to Step No. 7.

In summary, the feedback arrangement is such that a new logic "low" is injected into the A counter stage whenever the states of the E and F stages are different. Each succeeding SC CLOCK pulse causes the logic "low" to step one stage to the right. It will be seen that, so long as the "enable count" line 198 is "high," the program sequencer counter 150 proceeds sequentially through the counter states indicated in FIG. 5 as SC CLOCK pulses are received.

In order to translate the various possible counter states into Step Numbers, there is provided a decoding memory array 212 which comprises an upper decoding memory array 214 and a lower decoding memory array 216. As shown in FIGS. 6A and 6B, the Q and $\bar{Q}$ output lines of each of the six program sequence counter stages are connected to inputs at the top of the decoding memory array 212. For clarity, actual connections are illustrated only for the first, or A, counter stage. The upper and lower decoding arrays 214 and 216 function to output an appropriate signal along a corresponding horizontal Step Number line when a particular counter state is reached. The upper decoding array 214 has horizontal output lines for program Step Numbers from which jumps may occur extending to the "jump to" memory matrix. The lower decoding array 216 has a horizontal output line for each of the forty-three counter states utilized in the particular controller herein described. The upper decoding array 214 and the "jump to" memory matrix 201 together comprise the sequence control logic 152 of FIG. 4, and the lower decoding array 215 comprises a portion of what is termed the program memory 154 in FIG. 4. However, in one sense the sequence control logic 152 may also be considered "program memory."

The "jump from" Step Numbers programmed into the upper decoding array 214 are indicated in FIG. 5, left-hand column, by those step numbers having horizontal lines without arrow heads. As shown, jumps may be made from Step Nos. 2, 15, 30, 39, and 43 in the particular washing program shown. In FIG. 6A, "jump from" Step Number designators are drawn to each of the lines extending from the upper decoding array 214 to the inputs of the "jump to" memory matrix 201.

Since a decision whether to jump to a particular program step depends not only upon the particular step which the program sequencer counter 150 is in, but also upon the user cycle selections, the input portion of the upper decoding array 214 is connected to receive inputs from the user cycle selection switches (FIG. 1). Specifically, there are EXTRA RINSE, WASH, and SOAK lines, each of which is "high" when the corresponding option is selected. For complete decoding, three inverters supply $\overline{\text{EXTRA RINSE}}$, $\overline{\text{WASH}}$, and $\overline{\text{SOAK}}$ lines. Additionally, depending on whether the controller 60 is in the "run" mode or in the "compute" mode, the program sequencer counter 150 must either stop or jump back to the beginning upon reaching Step No. 39. To convey this instruction, a COMPUTE line 217 from the master control logic 180 (FIGS. 4 and 10) is also connected to the upper decoding array 214. The COMPUTE line 217 is "high" during the "compute" mode.

As may be seen from FIG. 6A, more than one of the array 214 output lines may correspond to the same "jump from" Step Number. Particular examples are the lines for jumps from Step Nos. 2 and 15. In normal operation (assuming correct programming) only one of the array 214 output lines is "low" at one time, otherwise the "jump to" memory matrix 201 would receive conflicting instructions. Which one of the array 214 output lines is "low" depends on the particular state of the external inputs to the controller 60 via the "User Cycle Selection" inputs. Thus, the particular controller structure illustrated and described herein permits there to be multiple jump possibilities from a particular program step, the particular one, if any, of the jump possibilities which occurs during any one execution of the washing program being dependent on the particular state of the external input.

The horizontal output lines from the lower decoding array 216 are connected to the input of an information memory array 218. Outputs of the information array 218 extend from the top thereof. Generally, these outputs, after passing through additional logic, provide the "Control Signals" (FIG. 4) to drive the various load devices within the washing machine 20. Additionally, those outputs designated OC1, OC2, IT1, IT2, and IT3 provide the "Internal Time Set" signal along the path 156 (FIG. 4) for the programmable timer 160. The "OC" output bits carry an "Origin Code" which indicates whether a user-selected time or an internally-selected time is to be used for a particular program step. If an internally-selected time is to be used, the "IT" output bits indicate that particular "Internal Time" interval. The lower decoding array 216, the information memory array 218, and the additional logic at the output of the information memory array 218 together comprise the program memory 154 of FIG. 4.

An exemplary structure for the various memory arrays will now be described with reference to FIG. 7. The particular structure described herein is a typical memory structure which can be implemented as a portion of a single large-scale integrated circuit including the entire controller 60 and using PMOS logic. It will be appreciated that any one of the many possible memory structures may be employed, and the structure herein described is not intended to be limiting.

For convenience, the structures of the lower decoding memory array 216 and the information memory array 218 only are described in detail herein, these two arrays being exemplary. The various other arrays are constructed along similar lines, differing only is size and particular programming. It will be recognized by those skilled in the art that the memory arrays 216 and 218 together comprise what is often termed a "read only memory" (ROM), commercially available in various forms.

Figure 7:
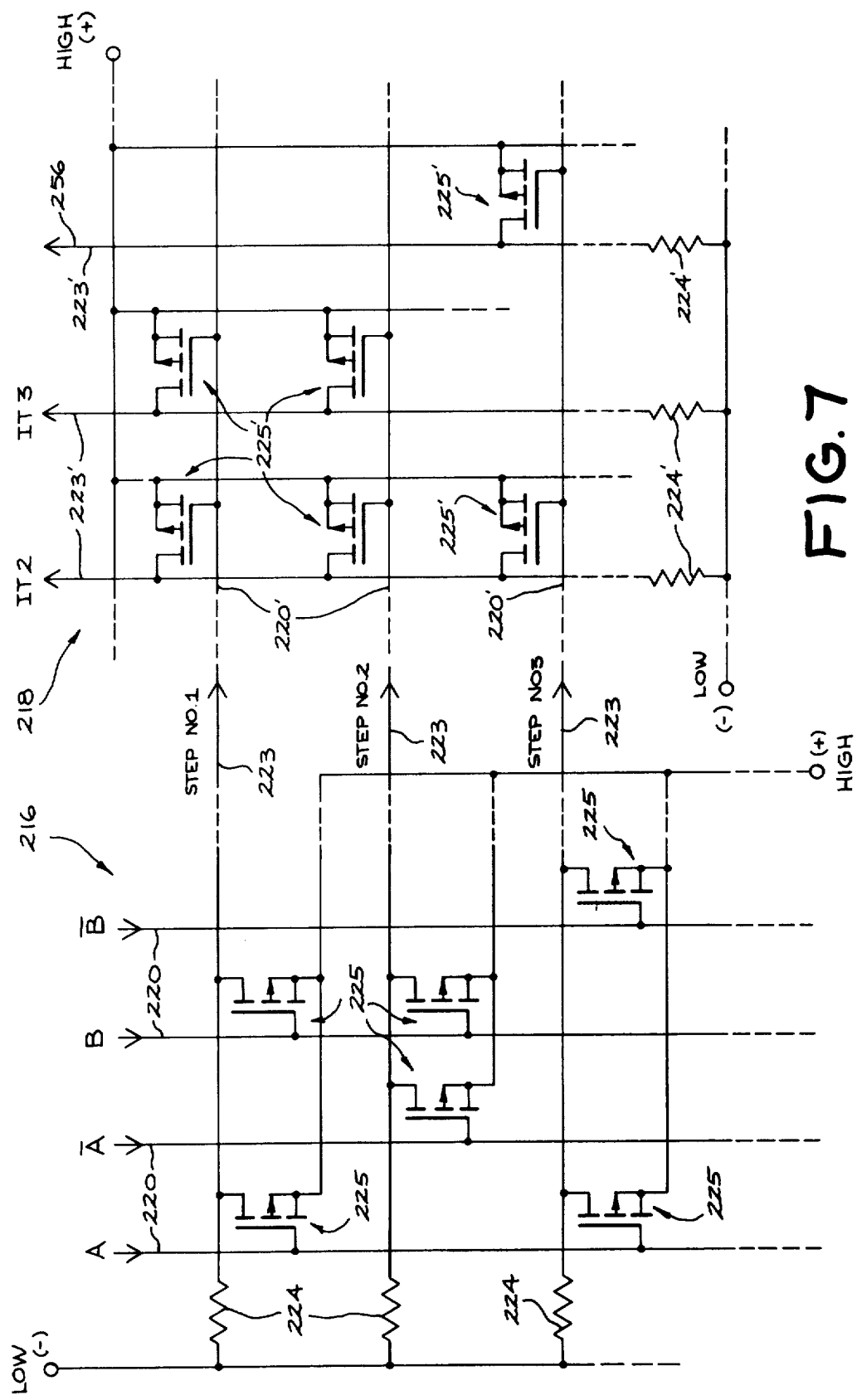
FIG. 7 is a partial schematic diagram illustrating in greater detail the structure of the memory matrices associated with the program sequencer of FIGS. 6A and 6B.

The memory structure will be best understood with reference to both FIGS. 6B and 7. Specifically, FIG. 7 shows greatly enlarged details of portions of the lower decoding memory array 216 and the information memory array 218. The heavy dots used in the array depictions of FIG. 6B actually are representative of locations of P-channel MOS transistors in FIG. 7. The specific FIG. 7 excerpts are portions of the first three rows of both arrays 216 and 218 (corresponding to Step Nos. 1, 2, and 3), of the first four columns of the array 216 (connected to inputs A, $\overline{\text{A}}$, B, and $\overline{\text{B}}$) and of columns 5, 6 and 7 of the array 218 (connected to outputs IT2, IT3, and line 256). The particular excerpted portions were selected arbitrarily to best illustrate the principles of the memory arrays.

Considering now specifically the lower decoding array 216, Each horizontal row functions generally as a NAND gate having an input at each of the locations marked with a heavy dot (FIG. 6B) or a transistor (FIG. 7). A logic "high" is required on all inputs having heavy dots to produce a logic "low" output. If any single input is "low," then the output is "high."

The memory array 216 comprises vertical input lines 220, horizontal output lines 223, load resistors 224 connected between each of the output lines 223 and a relatively negative DC supply (logic "low" voltage), and PMOS transistors 225 to effect the programming desired. The transistors 225 connect particular crosspoints of the input and output lines 220 and 223 according to the locations of heavy dots in FIG. 6B. Specifically, the gate terminals of the transistors 225 are connected to the input lines 220, the drain terminals are connected to the output lines 223, and the source terminals are all tied to a relatively positive DC supply (logic "high" voltage). As is customary in the fabrication of PMOS memory arrays, the load resistors 224 may comprise suitably biased and doped PMOS transistors on the same substrate as the transistors 225.

As an example of the operation of the memory array 216, if the program sequencer counter 150 (FIG. 6A) is in Step No. 1, then the A and B input lines 220 are "high," and the $\overline{\text{A}}$ and $\overline{\text{B}}$ input lines are "low." In order to generate a logic "low" output on a given horizontal output line 223, wherever there is a transistor the intersecting input line 220 must be "high" to cut off the transistor, allowing the particular load resistor 224 to pull the output line 223 "low." A conducting transistor would clamp its output line 223 to the logic "high" voltage. Thus, for the Step No. 1 input condition, only the Step No. 1 output line 223 is low. Each of the other output lines 223 is "high" because at least one transistor for each of the other output lines 223 is connected to an intersecting input line 220 which is "low," causing the transistor to conduct.

The memory array 218 on the right side of FIG. 7 has the same general structure, but differs in programming. In view of this same general structure, corresponding elements are designated by primed reference numbers, and will not be further described. In the particular logic context, the operation of the memory array 218 will be better understood if each vertical row is viewed as a low activated OR gate having an input at each of the locations marked with a heavy dot (FIG. 6B) or a diode (FIG. 7). The response is identical to that of a NAND gate.

Considering now the operation of the array 218, it should be kept in mind that all of the input lines 220' except for one are "high." (Which particular one input line 220' is "low" depends on the Step Number.) Since each vertical row of the array 218 functions generally as a low activated OR gate, the one input line 220' which is "low" causes each vertical row having an intersecting heavy dot or diode to output a logic "high." The other outputs of the array 218 remain "low."

Thus in the overall operation of the lower decoding array 216 and the information array 218, logic "high's" from the Q and $\overline{\text{Q}}$ outputs of the program sequencer counter 150 flip-flops are suitably decoded and passed through the two arrays to emerge as logic "high's."

While the various memories are described herein as being in the form of arrays, it will be appreciated that the identical functions may be accomplished by means of equivalent arrangements of logic gates. However, for maximum flexibility, the array approach described herein is preferred. A further generalization of the array approach is described hereinafter with particular reference to FIG. 11.

Returning to FIG. 6B, the previously-mentioned additional logic at the output of the information array 218 will be described. The additional logic provides additional functional capability in the particular application here concerned. The precise form is somewhat dependent on the particular application. In many applications it will be preferable to eliminate this additional logic entirely, relying on programming of the information array 218 to provide all necessary output decoding. In FIG. 4, the outputs of the program memory 154 were denoted "Interval Time Set" and "Control Signals." FIG. 6B thus shows these outputs in detail.

Specifically, to inhibit the energization of the various electromechanical load devices of FIG. 3 during the "compute" mode, eight output AND gates, each having an enabling input connected to a $\overline{\text{COMPUTE}}$ line, are provided. $\overline{\text{COMPUTE}}$ is "high" during the "run" mode. These output AND gates are designated 228 through 235. The functional load device to which each of these output AND gates is connected can be determined from the output designation of FIG. 6B. For example, the AND gate 231 operates the "dispense rinse agent" solenoid 120 (FIG. 3) when activated. This is accomplished through the representative driver transistor 62 and the reed relay coil 61.

Each of the output AND gates also has a signal input. For all except the AND gates 228 and 232, these inputs are supplied directly from outputs of the information array 218. For motor control, lines 236 and 237 are connected to inputs of the output AND gates 233 and 229, respectively. For additive dispensing operations, lines 238, 239, 240 and 241 are connected to the output AND gates 234, 230, 235 and 231.

To respond to User Temperature Selection inputs, the signal inputs of the AND gates 232 and 228 for the hot and cold water solenoids 100 and 104, respectively, are connected to the outputs of a water temperature decoding memory array 242. The water temperature memory array 242 may be constructed in a manner similar to the arrays 216 and 218, previously described with reference to FIG. 7. The operation and programming of the array 242 may be best understood if each horizontal row is viewed as a NAND gate with an input at each of the heavy dot locations. The outputs of the water temperature memory array 242 are connected to the inputs of upper and lower low activated OR gates 243 and 244, which are interposed between the actual outputs of the array 242 and the output AND gates 232 and 228. A "high" at the output of the upper low activated OR gate 243 is required to energize the hot water solenoid valve 100, and a "high" output from the lower low activated OR gate 244 is required for energization of the cold water valve solenoid 104.

Inputs to the water temperature memory array 242 include User Temperature Selection input lines A, B and C from the front panel switches 44 and 46. Additional inputs are from the information array 218. Specifically, there is a FILL line 250, a WASH FILL line 252, and a RINSE FILL line 254.

In addition to the FILL line 250, five additional output lines from the information array 218 are provided to operate the front panel indicator lamps 50, 52, 54 and 56 (FIG. 1). Specifically, there is a SOAK line 256, a WASH line 258, a RINSE line 260, an EXTRA RINSE line 262, and a SPIN DRY line 264. Each of these lines carries a logic "high" when the named function occurs. The SOAK line 256 and the SPIN DRY line 264 are simply connected to drive the front panel SOAK and SPIN DRY lamps 50 and 56 through suitable driver circuitry (not shown), there being no additional logic associated with these lines.

Since the WASH lamp 52 and the RINSE lamp 54 each indicate a second condition by blinking, additional logic is required. An input to the additional logic is a BLINK line 266 which continuously alternates between "high" and "low" approximately once per second. In particular, an OR gate 268 supplies a line 269 connected to energize the WASH lamp 52. One input of the OR gate 268 is connected to the WASH line 258, and the other input is connected to the output of an AND gate 270. The inputs of the AND gate 270 are connected to the FILL and BLINK lines 250 and 266 so that when FILL is "high" the AND gate 270 is enabled to be repetively activated by BLINK, thereby activating the OR gate 268 to cause the WASH lamp 52 to blink during a water filling operation.

Similarly, an OR gate 271 supplies line 272 connected to energize the RINSE lamp 54. One input of the OR gate 271 is connected directly to the RINSE line 260, and the other input of the OR gate 271 receives the output of an AND gate 273 having its inputs connected to the BLINK line 266 and the EXTRA RINSE line 262.

Finally, several control outputs of the memory arrays 216 and 218 are provided for the master control logic 180, described hereinafter with particular reference to FIGS. 10A and 10B. From the information array 218, a $\overline{\text{FILL}}$ line 274 is supplied by an inverter 275 having its input connected to the FILL line 250. A $\overline{\text{PWR OFF}}$ line 276 is supplied by an inverter 277 connected to the rightmost vertical output line of the array 218. Two additional outputs are taken from the Step Number output lines of the decoding array 216. These are a RESET BLINK line 278 supplied by an inverter 279 having its input connected to the Step No. 1 line, and a RESET COMPUTE line 280 supplied by an inverter 281 having its input connected to the Step No. 43 line. While these last two outputs may appear in FIG. 6B to be taken from the array 218, they are actually extensions of the horizontal Step Number output lines of the array 216.

The overall operation of the program sequencer 150 and associated elements shown in FIGS. 6A and 6B will now be considered. Reference to the program sequence chart of FIG. 5 is also required. In FIGS. 6A and 6B, the decoding array 212 senses the state of the counter 150. For each individual counter state (corresponding to a program step), a single Step Number output line of the lower decoding array 216 goes to logic "low." Additionally, in the case of program steps from jumps may be made, a particular "jump from" Step Number output line of the upper decoding array 214 outputs a logic "low" when the particular corresponding counter state occurs in coincidence with a user cycle selection input which requires a jump at that point in the program. As previously noted, for a particular program sequencer counter state for which "jump froms" are programmed, the particular array 214 output line which is "low" may be one of a plurality of possible "jump from" lines for that particular program Step Number, with the particular array 214 output line which is "low" depending on the state of the external input.

Considering the outputs of the arrays 216 and 218 together, it can be seen that the particular programming shown in FIGS. 6A and 6B produces appropriate outputs to drive the external load devices during the proper program steps. This operation may be best understood if several examples are considered. For example, for program Step No. 5 (FIG. 5) the counter 150 is in state "HHHLHH." For this counter state, the D stage has a logic "low" output on its Q output line, and a logic "high" output on its $\overline{Q}$ output line. Thus D is "high" and $\overline{D}$ is "low." The five remaining flip-flop stages each have a logic "high" at their respective Q outputs, and a logic "low" at their respective $\overline{Q}$ outputs.

In the Step No. 5 horizontal row in the lower decoding array 216, a logic "high" is applied to every intersection which has a heavy dot. This condition is not satisfied for any other horizontal row. In accordance with the row's NAND gate characteristic, a logic "low" output signal proceeds to the right along the output line 223 corresponding to Step No. 5, and only for Step No. 5, and enters the information array 218. Horizontal row 5 of the information array 218 has four heavy black dots. In accordance with the low activated OR gate characteristic of the vertical rows, four logic "high" outputs proceed upwardly along the output lines 223'.

Specifically, for the right-most heavy black dot the actual corresponding output line is designated 236 and is connected to the lower input of the AND gate 233. Assuming the "run" mode, $\overline{\text{COMPUTE}}$ is "high" and the AND gate 233 is activated to operate the motor 75. The output line 237 does not have a heavy black dot in the memory matrix at the intersection with the Step No. 5 row. The line 237 is therefore "low." This "low" is applied to the AND gate 229, which has its output connected to drive the spin/agitate relay coil 98 (FIG. 3). The spin/agitate relay 94 is not energized and the motor 74 rotates in a direction to produce agitation. Still considering the Step No. 5 example, the next heavy black dot from the right causes a logic "high" output along the SOAK line 256 which causes the SOAK indicator lamp 50 (FIG. 1) to be illuminated. As an aside, it should be noted that a logic "high" appears on the SOAK line 256 for all program Step Nos. 3 through 15 since there are heavy black dots in all of the corresponding memory matrix positions. Reference to the FIG. 5 program sequence chart indicates that these are program steps corresponding to the SOAK subcycle.

Considering now the left-most two dots in the line for program Step No. 5, these two dots are used to indicate the internally selected time according to the code which appears in the following Table I.

TABLE I

| INTERNAL TIME SET CODE | | | |
|---|---|---|---|
| IT1 | IT2 | IT3 | Minutes |
| L | L | L | 0.5 |
| L | L | H | 1.0 |
| L | H | L | 1.5 |
| L | H | H | 2.0 |
| H | L | L | 3.0 |
| H | L | H | 3.5 |
| H | H | L | 15.0 |
| H | H | H | 0.0 |

Figure 8:
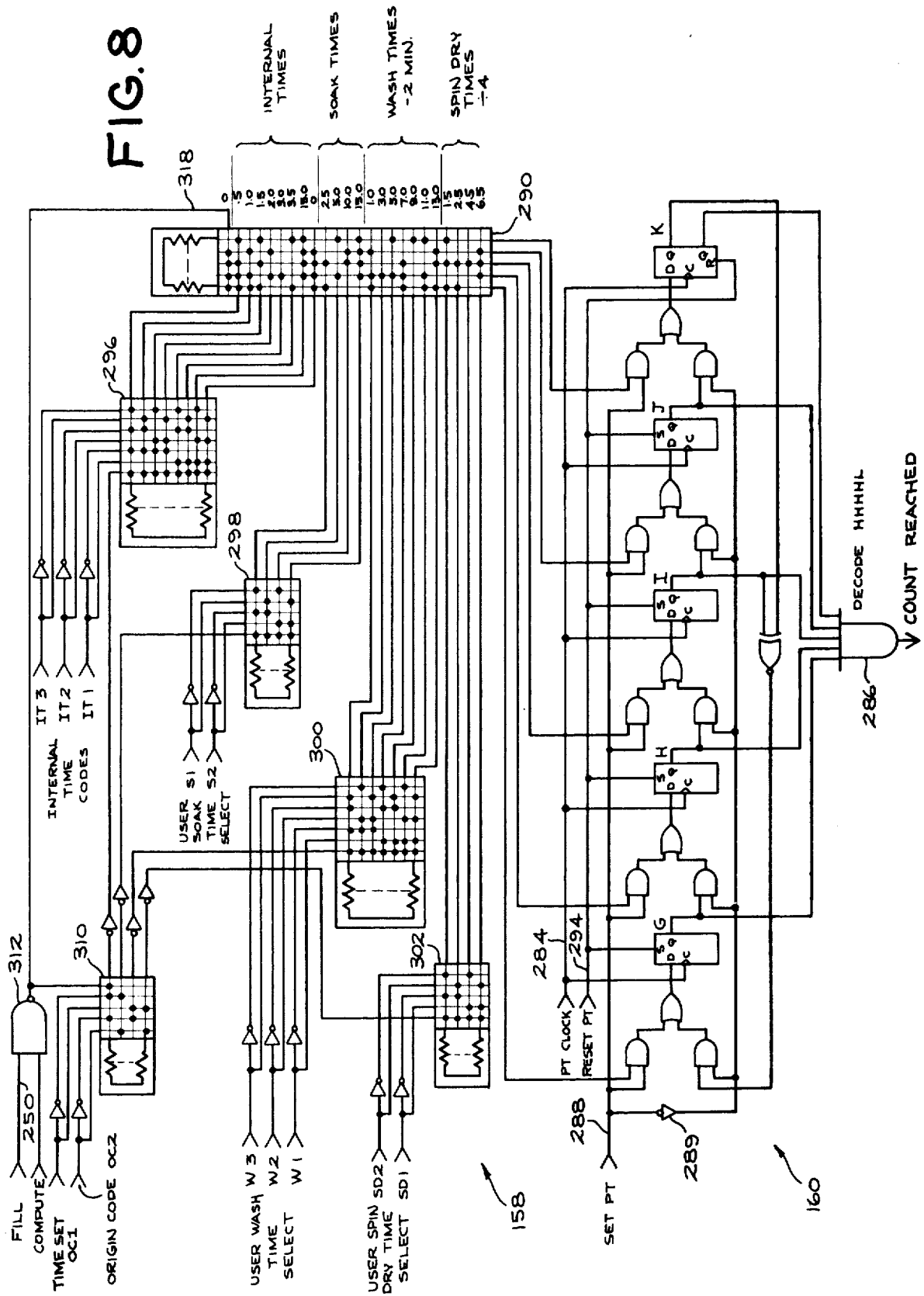
FIG. 8 is a detailed schematic diagram of the programmable timer portion of the electronic controller of FIG. 4, and associated memory matrices.

From Table I, it can be seen that output lines IT1, IT2, and IT3 together output a three-bit code which determines the time durations for program step which do not allow user-selection of the duration. This three-bit code is sent to the timer setting control 158 (FIGS. 4 and 8). Considering the specific outputted code for Step No. 5, it can be seen that heavy black dots appear in the matrix positions for IT1 and IT3. Logic "high's" result at these outputs. The internal time set code is therefore "HLH." From Table I, this can be seen to correspond to a duration of 3.5 minutes. Reference to the FIG. 5 Program Sequence Chart confirms that 3.5 minutes is the proper time duration for Step No. 5.

Still considering the outputs from the information memory array 218, the two-bit time set origin code appearing on output lines OC1 and OC2 indicates to the timer setting control 158 whether a user selected time or an internally selected time is to be employed to determine the duration of a particular program step. Table II below gives this code. Since the programming of the array 218 does not place a heavy black dot in either position OC1 or OC2 at the intersection with the line for Step No. 5 logic "low" outputs appear. From Table II, it can be seen that the time selection is internal. This means that the time duration for this particular Step No. 5 is always 3.5 minutes, determined by the controller's internal programming, and is not variable by the user.

TABLE II

| TIME SET ORIGIN CODE | | |
|---|---|---|
| OC1 | OC2 | Origin |
| L | L | Internal |
| L | H | T1 (User SOAK Time Selection ÷ 4) |
| H | L | T2 (User WASH Time Selection) |
| H | H | T3 (User SPIN DRY Time Selection) |

The operation of the array 218 and associated logic will now be considered for another examplary program step, in this case Step No. 16. For Step No. 16, the state of the counter 150 is "HHLHLH." In the lower decoding array 216, logic "high's" from the sequencer counter 150 correspond to the locations of the heavy black dots in hozizontal row corresponding to Step No. 16. The Step No. 16 horizontal output line goes "low".

Step No. 16 is the first fill operation in the wash and normal rinse subcycle. In the information array 218, the first heavy dot results in a logic "high" output on the FILL line 250. This logic "high," through the AND gate 270 and the OR gate 268 causes the WASH lamp 52 to blink to indicate a water-filling operation.

The next two intersections along the row for Step No. 16 in the information array 218 do not have dots. Therefore, a "LL" time set origin code passes along the lines OC1 and OC2 to the timer setting control 158, to indicate that the time duration of Step No. 16 is internally generated.

Next, the three-bit internal time set code of Table I is determined by the pair of heavy black dots followed by a matrix location having no dots. An internal time set code "HHL" is thereby selected. From Table I, this corresponds to a time duration of fifteen minutes. As previously mentioned, a FILL operation represents a special case in that the precise length of time required to fill the tub cannot readily be determined in advance. Thus the fifteen minutes is a "time out" time and it is expected that the actual duration of the filling operation will be much shorter. In a manner hereinafter described with reference to FIGS. 10A and 10B, the master control logic 180 steps the program sequencer counter 150 to the next step when a FULL TUB signal is received, rather than waiting for the end of the 15-minute time out period.

The last heavy black dot for Step No. 16 results in a logic "high" signal on the WASH FILL line 252, to ultimately cause the hot and cold water valve solenoids 100 and 104 (FIG. 3) to fill the washing tub with water of appropriate temperature.

The user temperature inputs A, B, and C are generated by the settings of the user wash temperature selector switch 44 and the user rinse temperature selector switch 46 (both FIG. 1) according to the coding shown in Table III, below. The coding described is accomplished by means of suitably arranged contacts on the switches 44 and 46 in a manner which will be readily understood to those skilled in the art. A DP3T switch may be employed for the wash temperature switch 44, and a SPDT switch for the rinse temperature switch 46.

TABLE III

| USER WATER TEMPERATURE SELECT CODE | | | |
|---|---|---|---|
| User Selection | A | B | C |
| Wash: Hot | H | L | X |
| Warm | H | H | X |
| Cold | L | H | X |
| Rinse: Warm | X | X | H |
| Cold | X | X | L |

X = don't care

With the foregoing in mind and from a study of Table III together with the programming of the water temperature decoding memory array 242, it will be seen that the hot and cold water solenoid valves 100 and 104 are appropriately activated. One point about the water temperature decoding array 242 programming that perhaps requires further mention is the input from the FILL line 250. From the programming of the information array 218 it can be seen that the FILL line 250 is "high" only during Step Nos. 3, 16, 27, and 34. However, during Step Nos. 13 and 24 where FILL and SPIN operations occur together, the FILL line 250 remains "low." The programming of the water temperature decoding array 242 inhibits operation of the hot water solenoid valve 100 under this condition, even though a warm rinse temperature may be selected.

The remaining aspect of FIGS. 6A and 6B is the upper decoding array 214 and its associated jump array 201. Each horizontal row of the upper decoding array 214 may be viewed as a NAND gate, and each vertical row of the jump array 201 may be viewed as a low activated OR gate. A "low" applied to any one of the horizontal input lines of the jump array 201 results in "high" outputs at each heavy black dot location for the purpose of presetting the sequence counter 150. Additionally, the right-most vertical row in the jump array 201 has a heavy block dot in every position. Whenever a jump operation is to occur, one of the horizontal input lines to the jump array 201 goes low, and the rightmost vertical output line 199, which is the "enable preset" line, goes "high."

The programming of the upper decoding array 214 is such that an output appears on one of its output lines only when both a counter state corresponding to a "jump from" Step Number is reached, and the user cycle selections are appropriate. For example, if the user has selected a WASH operation, but has not selected a SOAK operation, logic "high" SOAK and WASH signals are applied to the first two heavy dot locations, respectively, in the first horizontal row of the upper decoding array 214. Whether an extra rinse has been selected is irrelevant to this particular decision. Therefore in the first row there is no heavy black dot connected to either the EXTRA RINSE line or the $\overline{\text{EXTRA RINSE}}$ line.

Still assuming a user cycle selection of WASH but not SOAK, when program Step No. 2 is reached, corresponding to a counter state of "HHHHHL," then a logic "low" output signal along the uppermost horizontal output line of the array 214 (lowermost input of the array 201) causes the jump array 201 to output appropriate signals, including a logic "high" of the "preset" line 199, to preset the counter 150 to "HHLHLH" for Step No. 16.

In a similar manner, it can be seen that the programming of the upper decoding array 214 and the jump array 201 causes the other jump conditions outlined in the Program Sequence Chart of FIG. 5 to be accomplished.

DESCRIPTION OF THE TIMER SETTING CONTROL 158 AND THE PROGRAMMABLE TIMER 160

Figures 9, 10, 10A, 10B:
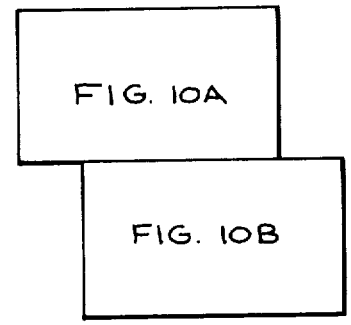
FIG. 9 is a chart, similar to that of FIG. 5, showing the steps through which the programmable timer of FIG. 8 cycles.
FIG. 10 depicts how
FIGS. 10A and 10B are joined.
Figure 10A:
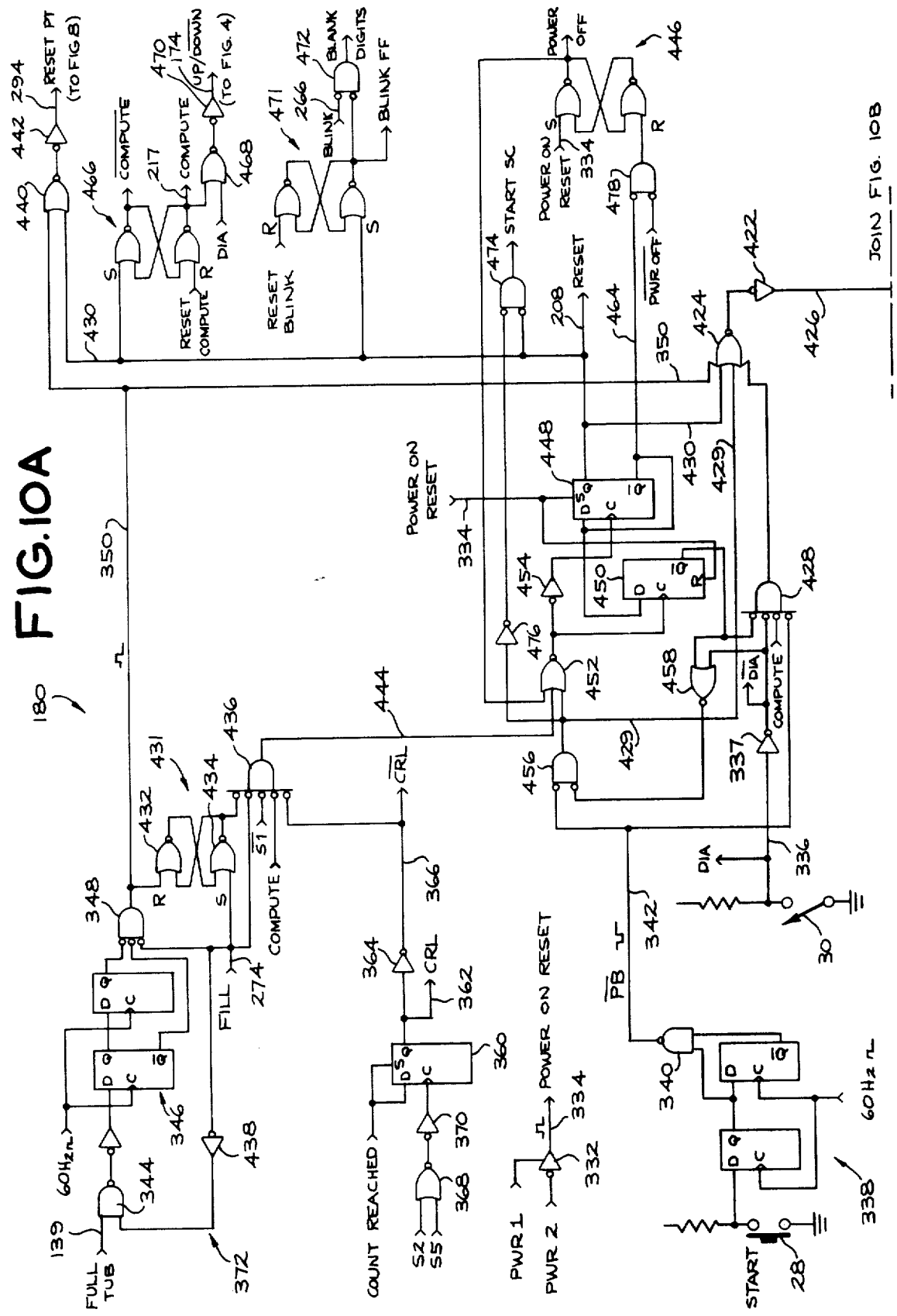
Figure 10B:
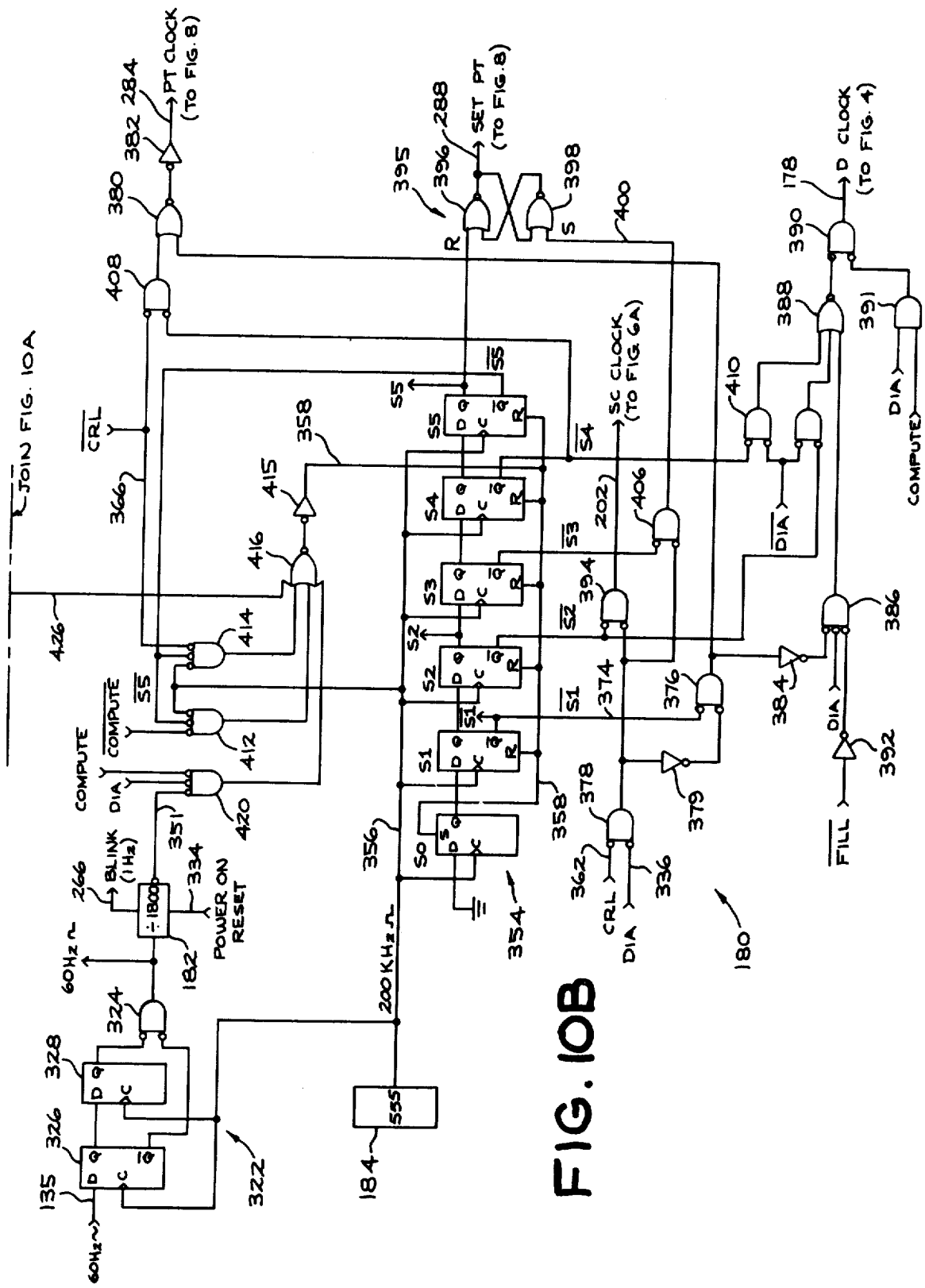

With reference now to FIGS. 8 and 9, the programmable timer 160 and associated circuitry will now be described, along with the operation thereof.

The programmable timer 160 is similar to the previously discussed program sequencer counter 150 in that it comprises a series of D type flip-flops connected generally as a shift register. Differences are that the programmable timer counter 160 has only five flip-flop stages, G, H, I, J and K; and the inputs of the EXCLUSIVE NOR gate 282 are connected to the Q output of the I flip-flop and the $\overline{Q}$ output of the K flip-flop, rather than to the Q outputs of the last two flip-flops in the chain. This particular feedback connection of the EXCLUSIVE NOR gate 282 results in the counting sequence shown in the "Programmable Timer Sequence Chart" of FIG. 9. Another difference is that intermediate counter states are not decoded. Rather, a useful output results when Count No. 31 (FIG. 9) is reached (counter state "HHHHL"). An AND gate 286 is provided to decode this state and to output the COUNT REACHED signal. A similarity is that the programmable timer counter 160 includes an AND-OR select gate at the input of each counter state so that the counter 160 may either accept a predetermined initial counter state from the timer setting control 158, or may simply count in response to inputted clock pulses appearing on a PT CLOCK input line 284 in accordance with the "counter state" sequence of FIG. 9. Which occurs is controlled by the signal on a SET PT line 288. The SET PT line 288 is directly connected to enable the upper AND gates of the AND-OR select gates for presetting, and is connected through an inverter 289 to the lower AND gates to enable sequential counting when SET PT is "low."

In the operation of the programmable timer 160, a logic "high" on the SET PT line 288 enables the upper AND gates in the AND-OR select gates so that an initial counter state may be loaded into the counter from the output of a counter setting memory array 290. When the SET PT line 288 is "low," the output of the inverter 289 is "high" and the counter counts in response to inputted PT CLOCK pulses according to the sequence of FIG. 9.

Lastly, a RESET PT input line 294 is provided to reset the counter 160 to a Count No. 31 (counter state "HHHHL") at any time. To accomplish this, the RESET PT input line 294 is connected to the "set" (S) inputs of the G, H, I, and J flip-flops, and to the "reset" (R) input of the last or K flip-flop.

Each vertical row of the counter setting memory array 290 may be viewed as a low activated OR gate. Connected to the various horizontal input lines of the memory array 290 are outputs of an internal time memory array 296, a soak time memory array 298, a wash time memory array 300, and a spin time memory array 302. In each of these last mentioned four memory arrays, each horizontal row may be viewed as a NAND gate.

The internal time memory array 296 receives the three-bit internal time code, IT1, IT2, and IT3, from the information array 218 (FIG. 6B), with the coding as indicated in Table I, above. In a similar manner, the soak time memory array 298, the wash time memory array 300, and the spin time memory array 302 receive user time selection inputs coded as indicated in the following Tables IV, V, and VI.

TABLE IV

| USER SOAK TIME SELECT CODE | | | |
|---|---|---|---|
| User-Selected Time (Minutes) | Counter Time (Minutes) | S1 | S2 |
| 10.0 | 2.5 | L | L |
| 20.0 | 5.0 | L | H |
| 40.0 | 10.0 | H | L |
| 60.0 | 15.0 | H | H |

TABLE V

| USER WASH TIME SELECT CODE | | | | |
|---|---|---|---|---|
| User-Selected Time (Minutes) | Counter Time (Minutes) | W1 | W2 | W3 |
| 3 | 1 | L | L | H |
| 5 | 3 | L | H | L |
| 7 | 5 | L | H | H |
| 9 | 7 | H | L | L |
| 11 | 9 | H | L | H |
| 13 | 11 | H | H | L |
| 15 | 13 | H | H | H |

TABLE VI

| USER SPIN DRY TIME SELECT CODE | | |
|---|---|---|
| Selected Time (Minutes) | SD1 | SD2 |
| 1.5 | L | L |
| 2.5 | L | H |
| 4.5 | H | L |
| 6.5 | H | H |

To provide these user input signals, the contacts of the soak time select switch 34, the wash time select switch 38, and the spin time select switch 42 (FIG. 1) are suitably arranged. For full decoding, each of these input lines has an inverter to provide a set of inverted inputs to the memory arrays.

An additional input to each of the memory arrays 296, 298, 300, and 302 is provided by an origin code memory array 310. The origin code memory array 310 receives the two-bit OC1 and OC2 time set origin code generated by the information array 218 (FIG. 6B) and produces logic "low" output signals which are inverted to logic "high" signals to enable the time memory arrays 296, 298, 300 and 302 one at a time.

In order to handle the special case of the fill time interval during "compute" mode operation, a NAND gate 312 receives the FILL signal on the line 250 from the information array 218 (FIG. 6B) and the COMPUTE signal from the master control logic 180 (FIGS. 4 and 10). If both FILL and COMPUTE are "high," the output of the NAND gate 312 goes low to do two things: First, it prevents the origin code memory array 310 from enabling the internal time memory array 296, even though the "LL" internal time set origin code may be coming from the information array 218. Second, by means of the line 318 extending directly to the first horizontal row of the counter setting aray 290, it readies a state of "HHHHL" for Count No. 31 corresponding to a zero time duration for loading into the programmable timer counter 160 the next time SET PT goes high.

The overall operation of the timer setting control 158 and the programmable timer together is directed by control signals from the master control logic 180 (FIGS. 4, 10A and 10B). For each program advancing operation during both the "compute" and the "run" modes, a PT CLOCK pulse on the line 284 causes the counter 160 to assume a new state. If at the particular moment the programmable timer 160 is accumulating PT CLOCK pulses to control the duration of a particular program Step Number, then SET PT is "low" and the inverter 289 is enabling the lower AND gates for sequential counting. If at the time a program advancing operation occurs the counter 160 reaches Count No. 31 in response to a PT CLOCK pulse, then COUNT REACHED goes "high," signalling the master control logic 180 to, among other things, enter a new program Step and cause a new time duration to be set into the programmable timer 160. In this case, SET PT goes high, a new time setting appears at the output of the counter setting memory array 290, and another PT CLOCK pulse is received to load in the new time setting. Depending upon the particular program Step Number, the new time setting may correspond to an internally selected time duration or a user selected time duration. Thereafter, additional PT CLOCK pulses are received as program advancing operations occur, until Count No. 31 is reached, whereupon the cycle repeats.

DESCRIPTION AND OPERATION OF THE MASTER CONTROL LOGIC 180

Referring finally to FIGS. 10, 10A and 10B, there is shown a schematic circuit diagram of the master control logic 180 which is interconnected, as generally represented in FIG. 4, with the various other elements in the electronic controller 60 to direct the operation thereof.

The master control logic 180 receives a number of inputs from sources external to the electronic controller 60, for example from switches in the washing machine 20. A number of these inputs are discussed below.

To provide a time base, a low voltage sixty Hz AC sine wave is input along the line 135. From FIG. 3, it can be seen that when the lid switch contact 133 is open, this time base source is interrupted, thereby halting the operation of the controller 60, but not resetting it. In FIG. 10B, the line 135 is connected to a conditioning circuit 322 which functions to output a sixty Hz pulse signal from a low activated AND gate 324. In addition to the low activated AND gate 324, the conditioning circuit 322 comprises a two-stage clocked shift register comprising D-type flip-flops 326 and 328. The clock inputs (C) of the flip-flops 326 and 328 are supplied by the high-speed clock oscillator 184.

In the operation of the conditioning circuit 322, during each AC cycle when the sixty Hz input goes from a relatively low voltage to a relatively high voltage, a logic "high" is clocked through the flip-flops 326 and 328. During high-speed clocking, there is an interval between successive clock pulses during which the $\overline{Q}$ output of the flip-flop 326 and the Q output of the flip-flop 328 are both "low." The low activated AND gate 324 outputs a logic "high" pulse.

Another input to the master control logic 180 is a pair of DC power inputs PWR1 and PWR2. PWR1 is connected to the DC supply terminal of an inverter 332, while PWR2 is connected to the input of the inverter 332. The power supply 146 (FIG. 3) is arranged by means of suitable RC time delay circuitry such that PWR1 comes up before PWR2. The inverter 332 initially outputs a logic "high" POWER ON RESET signal along a line 334 until PWR2 comes up. This initial POWER ON RESET signal initializes the controller 60 in a manner hereinafter described.

A third input to the master control logic 180 is from the SERVICE switch 30 (FIGS. 2 and 10A). When the SERVICE switch 30 is in the NORMAL position (closed), a "diagnostic"(DIA) line 336 goes "low." An inverter 337 outputs a "high" on a $\overline{DIA}$ line. Conversely, when the "diagnostic" mode is selected, DIA is "high" and $\overline{DIA}$ is "low."

A fourth input to the master control logic 180 is from the START switch 28 (FIGS. 1 and 10A). The input from the START switch 28 is applied to a transistion detector and debounce network 338, which is similar to the conditioning circuit 322. It also comprises a two-stage clocked shift register clocked by the sixty Hz pulse signal. The transition detector and debounce network 338 has as its output stage a NAND gate 340 which supplies a $\overline{PB}$ line 342. In response to each operation of the START pushbutton switch 28, a logic "low" $\overline{PB}$ pulse is output along the line 342. The $\overline{PB}$ line 342 is normally "high."

Another input to the master control logic 180 is a FULL TUB signal input along the line 139 from the FULL TUB switch contact 138 (FIG. 3). The line 139 is "high" when the tub is full. The FULL TUB signal is gated through a NAND gate 344 to another debounce network 346, similar to the previously-discussed debounce network 338. The debounce network 346 has a low activated AND gate 348 as its output stage. The low activated AND gate 348 outputs a logic "high" signal along a line 350 whenever both a FULL TUB signal is received and the other conditions required by the gates 344 and 348 are satisfied.

In addition to the above-described inputs, the master control logic 180 receives various inputs from other elements of the controller 60 (FIGS. 4, 6A, 6B and 8). These inputs are described hereinafter as the description proceeds.

CLOCK PULSE SOURCES

As previously mentioned, the electronic controller 60 includes means for producing basic clock pulses and a means for producing high speed clock pulses. The means for producing basic clock pulses is designated 182 in FIG. 4, and is depicted as a "basic clock." In FIG. 10B, this means is shown more specifically as a "divide by 1800" counter 182. The "divide by 1800" counter 182 counts sixty Hz time base pulses until a count of 1800 is accumulated. At this point, a momentary logic "low" pulse is outputted along a line 351. For a power line frequency of sixty Hz, 1800 counts are accumulated every thirty seconds.

It will be appreciated by those skilled in the art that a counter such as the "divide by 1800" counter 182 may readily be constructed using flip-flops and appropriate feedback. For example, a shift register type counter such as the programmable timer counter 160 (FIG. 8) may be employed, with a gate such as the AND gate 286 connected to decode the particular counter state corresponding to a count of 1800. If this type of counter is employed, eleven stages are required to accumulate a count of 1800.

The counter 182 additionally outputs a BLINK signal having a frequency of approximately one Hz on the BLINK line 266. The precise frequency is not important as this BLINK signal is merely used to cause the various indicator lamps and displays to blink when appropriate. It will be appreciated that the BLINK signal may readily be tapped off one of the stages of the counter 182.

The means for producing high speed clock pulses is designated 184 in FIG. 4, and depicted as a "high speed clock." More specifically, in FIG. 10, this high speed clock 184 may be seen to comprise quite simply an oscillator, such as a conventional "555" IC timer set up as an astable multivibrator having an output frequency of approximately 200 KHz.

MASTER CONTROL LOGIC SHIFT REGISTER

A six-stage shift register 354 (FIG. 10B) is an important element of the master control logic 180. The shift register 354 comprises six serially connected D-type flip-flop stages, designated S0, S1, S2, S3, S4, and S5. For convenience, each of the shift register flip-flop output lines has the same designation as the corresponding flip-flop stage. For example, the Q output of the S2 flip-flop is also designated "S2," and the $\overline{Q}$ output of the S1 flip-flop is designated "$\overline{S1}$."

The output of the high speed clock 184 is connected along a clock line 356 to directly and continuously clock the shift register 354.

The shift register 354 has a "reset" line 358 which is connected to the "set" (S) input of the flip-flop S0 stage, and the "reset" (R) inputs of the remaining five flip-flop stages. When a logic "high" appears on the reset line 358, the shift register 354 is reset to an initial state of "HLLLLL," and it is held in that state so long as the reset line 358 remains "high." Triggering of the shift register 354 is accomplished by release of the reset line 358 to logic "low," whereupon the logic "high" in the S0 flip-flop stage rapidly steps to the right through the remaining flip-flop stages in response to high speed clock pulses along the clock line 356. Since the D input of the flip-flop stage S0 is tied to logic "low," the shift register 354 remains in a terminal state of "LLLLLL" until such time as another logic "high" appears on the reset line 358.

In a manner hereinafter described, each time the shift register 354 is thus triggered, the logic "high" stepping through the various stages produces a momentary flurry of activity throughout the electronic controller 60. At other times, when the shift register 354 is idling in the "LLLLLL" state, there is little activity throughout the controller 60. Each operation of the shift register 354 generally corresponds to and in fact controls a "program advancing operation," previously mentioned. In most cases, the shift register 354 is triggered once for each program advancing operation. However, for program advancing operations which cause a program step to be completed or which cause a program step having a zero time duration to be entered, additional triggerings of the shift register 354 occur.

Tied in closely with the shift register 354 is a "count reached" latch 360 (FIG. 10A) which comprises a D-type flip-flop. The output of the "count reached" latch is along a CRL line 362. Additionally, an inverter 364 provides a $\overline{CRL}$ signal along a line 366. The data (D) input of the latch 360 is connected to receive the logic "high" COUNT REACHED signal from the AND gate 286 (FIG. 8). The COUNT REACHED line is also tied to the "set"(S) input of the latch 360. To provide two clock pulses for the latch 360 during each operation of the shift register 354, the shift register S2 and S5 output lines are connected to the inputs of a NOR gate 368 which is followed by an inverter 370.

In the operation of the "count reached" latch 360, normally COUNT REACHED and CRL are both "low." When COUNT REACHED goes "high," the latch 360 and CRL are immediately set to "high." After COUNT REACHED returns to "low," a "low" is applied to the data (D) input, but CRL remains "high" until the latch 360 is clocked.

SHIFT REGISTER STEPS

The circuitry and events associated with a logic "high" as it steps through each of the stages of the shift register 354 will now be considered. For convenience of description, the shift register state which exists when the logic "high" is in a particular stage may be referred to herein simply as a shift register step.

When the logic "high" is set into shift register stage S0, (shift register step S0) nothing in particular happens because no outputs (other than the data (D) input for the next shift register stage S1) are taken from the stage S0. The shift register 354 is held in the state "HLLLLL" so long as the reset line 358 carries a logic "high."

For shift register step S1, a number of things can happen. For one thing, the $\overline{S1}$ line carries a logic "low" upwardly to "Full Tub" circuitry 372 (discussed later). Additionally, a downwardly-extending portion 374 of the $\overline{S1}$ line carries a logic "low" to the upper input of a low activated AND gate 376. If other conditions are satisfied, the output of the low activated AND gate 376 goes on to generate a PT CLOCK pulse for the programmable timer 160 (FIG. 8) and additionally a D CLOCK pulse for the up/down digital counter 164 (FIG. 4).

Other conditions which must be satisfied for a PT CLOCK pulse to be produced are sensed by a low activated AND gate 378, followed by an inverter 379. Specifically, the upper input of the low activated AND gate 378 must be "low," which occurs when CRL is "low" and the programmable timer 160 has not reached the end of its counting sequence. Additionally, the DIA line 336 connected to the lower input of the low activated AND gate 378 must be "low," which occurs when the "diagnostic mode" has not been selected. When these conditions are satisfied, the low activated AND gate 376 outputs a logic "high" which is received by the lower input of a NOR gate 380, the logic "low" output of which is inverted by an inverter 382 to produce a logic "high" PT CLOCK pulse.

The logic "high" output of the low activated AND gate 376, after being inverted to a logic "low" by an inverter 384, is additionally applied to the upper input of a low activated AND gate 386. The low activated AND gate 386 is thus enabled to produce a logic "high" output through a NOR gate 388 and a low activated AND gate 390 to produce the D CLOCK signal for the up/down digital counter 164 (FIG. 4). To enable the low activated AND gate 390 when DIA and COMPUTE are not both high, an AND gate 391 receiving its inputs from the DIA and COMPUTE lines has its output connected to the low activated AND gate 390. The inputs of the low activated AND gate 386 also require that DIA is "low" ("diagnostic" mode not selected), and $\overline{FILL}$ is "high" (program sequencer 150 is not in a "fill" step). An inverter 392 is provided to produce the required "low" on the lower input of the low activated AND gate 386 when $\overline{FILL}$ is "high."

If the shift register stage S1 has the logic "high" at a time when the programmable timer 160 has reached its count and CRL is therefore "high," then the low activated gate 378 is not activated and the shift register 354 merely steps to the next state, without either a D CLOCK or a PT CLOCK pulse being produced.

For shift register step S2, if other conditions are satisfied, a low activated AND gate 394 produces an SC CLOCK pulse for the program sequence counter 150 (FIG. 6A). For an SC CLOCK pulse to be produced, not only must $\overline{S2}$ be low, but the output of the low activated AND gate 378 applied to the lower input of the low activated AND gate 394, must also be "low." For the output of the low activated AND gate 378 to be "low," either the programmable timer 164 must have reached its count so that CRL is "high," or the "diagnostic" mode must have been selected so that DIA is "high."

In addition to producing an SC CLOCK at this time, the S2 line applied to the upper input of the NOR gate 368 feeding the clock input of the "count reached" latch 360 permits resetting of the count reached latch 360 if COUNT REACHED is "low."

If none of the foregoing conditions are satisfied, the logic "high" merely steps to shift register stage S3 upon receipt of the next pulse along the clock input line 356, without either an SC CLOCK pulse being produced or resetting of the "count reached" latch 360 occurring.

For shift register step S3, what can occur, again if other conditions are satisfied, is the setting of a flip-flop 395 to cause SET PT to go high. The flip-flop 395 comprises a pair of NOR gates 396 and 398 cross-coupled such that a logic "high" on a set (S) line 400 produces a "high" output on the SET PT line 288. This enables setting of the programmable timer 160 (FIGS. 4 and 8) to establish a duration for a particular program step. The shift register output line S5 is connected to the reset (R) input for later resetting of the flip-flop 395.

The flip-flop 395 is set if a logic "high" is produced at the output of a low activated AND gate 406, which requires not only a logic "low" on the $\overline{S3}$ line applied to the upper input of the low activated AND gate 406, but also requires a logic "low" output from the low activated AND gate 378. The output of the low activated AND gate 378 is "low" either if CRL is "high" or if DIA is "high."

For shift register step S4, another PT CLOCK pulse can be produced. This is accomplished through a low activated AND gate 408 having the lower input connected to the $\overline{S4}$ line and the output connected to the upper input of the NOR gate 380. For a PT CLOCK pulse to be produced at this time requires that the upper input of the low activated AND gate 408 connected to the $\overline{CRL}$ line 366 be "low." This corresponds to a condition where the programmable timer 160 is sitting on "count reached" waiting for a new time duration to be set. Since, SET PT is "high," a PT CLOCK pulse at this time causes a new time duration to be clocked into the programmable timer 160 (FIG. 8).

A low activated AND gate 410 also has an input connected to the $\overline{S4}$ line, with the outer input connected to the $\overline{DIA}$ line. If the "diagnostic" mode has been selected, then $\overline{DIA}$ is "low." This enables the low activated AND gate 410 to output a logic "high" to the NOR gate 388 to produce a D CLOCK pulse. Thus, when the controller 60 is in the "diagnostic" mode, D CLOCK pulses are produced during shift register steps S1 and S4.

Considering finally shift register step S5, the S5 signal line connected to the lower input of the NOR gate 368 again clocks the count reached latch 360 to enable resetting of CRL to "low" if, as a result of a new time being programmed in, the programmable timer 160 is now no longer sitting on "count reached."

Additionally, a logic "high" on the S5 line resets the flip-flop 395. Lastly, a logic "low" is applied along the $\overline{S5}$ line to the middle inputs of low activated AND gates 412 and 414. This logic "low" signal along the $\overline{S5}$ line enables the low activated AND gate 414 to retrigger the shift register 354 in the event $\overline{CRL}$ is still "low," meaning that the new time duration which was programmed into the programmable timer 160 is zero. When this occurs, the shift register 354 is immediately retriggered to enable, among other things, an SC CLOCK pulse for the program sequencer counter 150 to be produced so that the next desired program step may be entered.

By way of summary of the foregoing, what occurs during each cycle of the shift register 354 under various conditions will now be considered. First, it will be assumed that the "diagnostic" mode has not been selected so that DIA is "low." It will be further assumed that the programmable timer 160 is part way through a counting sequence but has not yet reached its count so that COUNT REACHED and CRL are both "low." Under these conditions, for shift register step S1, a PT CLOCK pulse and a D CLOCK pulse are both produced. This increments the programmable timer 160 by one, and sends one pulse to the binary 177 (FIG. 4). During shift register steps S2, S3, S4 and S5, nothing happens. When the next high speed clock pulse is received along the line 356, the shift register 354 goes into the "LLLLLL" state, which is its idle condition.

Second, it will be assumed that the "diagnostic" mode has still not been selected so that DIA is "low," and that the programmable timer 160 is at Count No. 30 (FIG. 9), meaning it is just ready to reach its last count upon the receipt of the next PT CLOCK pulse along the line 284. For shift register step S1, since CRL initially is "low," both PT CLOCK and D CLOCK pulses are produced. However, the PT CLOCK pulse increments the programmable timer 160 to Count No. 31 so that COUNT REACHED and CRL both go "high."

For shift register step S2, an SC CLOCK pulse is produced. This causes the program sequencer counter 150 to enter its next step according to the sequence of FIG. 5. The next step may, depending upon the programming, be the result of either a simple increment or a jump. In either case, a new Internal Time Set signal is sent from the program memory 154 to the timer setting control 158 (FIGS. 4 and 8), ready to be clocked into the programmable timer 160. Additionally, during shift register step S2, an attempt is made to reset the count reached latch 360, but since a new time interval has not yet been loaded into the programmable timer 160, COUNT REACHED and CRL remain "high."

For shift register step S3, the flip-flop 395 is set, producing a logic "high" SET PT signal to enable the programmable timer 160 to receive a new time duration. However, COUNT REACHED and CRL remain "high."

For shift register step S4, another PT CLOCK pulse is produced, clocking a new program state into the programmable timer 160. COUNT REACHED immediately goes "low." CRL remains "high" because the count reached latch 360 does not yet receive a clock pulse.

For shift register step S5, the flip-flop 395 is reset, and SET PT goes back to "low." Additionally, the S5 line applies a logic "high" to the input of the NOR gate 368, producing a clock pulse for the count reached latch 360. CRL goes "low" and $\overline{CRL}$ goes "high." The "high" $\overline{CRL}$ signal on the line 366 disables the low activated AND gate 414, so that the shift register 354 is not retriggered and enters its idle state.

As a third condition if, in the second example discussed immediately above, the new Step Number (FIG. 5) after shift register step S1 is either Step No. 0, Step No. 1, Step No. 2, or Step No. 43, then a zero time duration is programmed into the programmable timer 160 in response to the PT CLOCK pulse during shift register step S4. In this case, COUNT REACHED remains at logic "high." When shift register step S5 is reached, CRL remains "high" and $\overline{CRL}$ remains "low." All "low" inputs are applied to the low activated AND gate 414, and the shift register 354 is immediately retriggered for a second operation. The following briefly outlines the events occurring during this second operation of the shift register 354/

For step S1, since CRL is "high," nothing happens.

For step S2, an SC CLOCK pulse is produced. An attempt is made to reset CRL to logic "low." Since there has been no opportunity to clock a new time into the programmable timer 160, COUNT REACHED and therefore CRL remain "high."

For Step S3, the flip-flop 395 is set to produce a logic "high" SET PT signal.

For Step S4, PT CLOCK pulse is produced. At this point, assuming a non-zero time duration is now clocked into the programmable timer 160, COUNT REACHED goes "low," permitting CRL to go "low" during step S5 when the count reached latch 360 is clocked. The shift register 354 can then enter the idle state "LLLLLL."

Fourth, it will be assumed the "diagnostic" mode is selected. DIA is "high" and $\overline{DIA}$ is "low." Each time the shift register 354 is triggered, the following occurs:

For step S1, nothing happens. For step S2, SC CLOCK and D CLOCK pulses are produced. For step S3, nothing happens. For step S4, another D CLOCK pulse is produced. In step S4, a PT clock pulse may be produced, but it is irrelevant. Upon reaching step S5, the shift register 354 goes into its idle condition, awaiting another trigger.

Thus, in the "diagnostic" mode, each triggering of the shift register 354 produces a single SC CLOCK pulse to increment the program sequencer counter 150 by one program step, and two D CLOCK pulses are produced to increment the digital counter 164 (FIG. 4)

for the numerical readout 48. Two D CLOCK pulses are required to increment the counter by 164 one count due to the binary element 177.

TRIGGERING OPERATION OF THE SHIFT REGISTER 354

The various events which can trigger an operation of the shift register 354 will now be considered. As previously mentioned, a shift register operation is triggered whenever the reset line 358 goes "high," forcing the shift register to a "HLLLLL" state, and then returns to "low." An inverter 415 supplies the shift register reset line 358. Therefore, a logic "low" followed by a logic "high" at the input of the inverter 415 triggers an operation of the shift register 354. A NOR gate 416 supplies the inverter 415.

There are actually seven different events which can trigger an operation of the shift register 354, some of which are alluded to above. The first three of these triggering events correspond to the low activated AND gate 412, the low activated AND gate 414, and a low activated AND gate 420 being activated, thereby applying a logic "high" to an input of the NOR gate 416. An inverter 422 and another NOR gate 424 (FIG. 10A) collect four additional inputs which may be applied along a line 426 to an input of the NOR gate 416. The NOR gates 416 and 424 are effectively a single, seven-input NOR gate.

The seven events which can trigger an operation of the shift register 354 will now be considered in the order at which their input lines are applied to the effective seven-input NOR gate just referred to.

The first event corresponds to activation of the low activated AND gate 420, and may be considered a normal trigger. It occurs when the basic clock 182 outputs a logic "low" pulse along the line 351, the "diagnostic" mode is not selected so DIA is "low," and the "compute" mode is not enabled so COMPUTE is "low."

The second possible triggering event corresponds to activation of the low activated AND gate 412, which functions when the "compute" mode is enabled and $\overline{COMPUTE}$ is "low." During the "compute" mode, it is desired that the shift register 354 be retriggered continuously. For shift register step S5, $\overline{S5}$ is "low." Since the high speed clock pulse line 356 is "low" between high speed clock pulses, the low activated AND gate 412 is activated.

The third event which may trigger an operation of the shift register 354 corresponds to activation of the low activated AND gate 414. This particular event was previously discussed and corresponds to $\overline{CRL}$ being "low" when step S5 of the last preceding shift register operation is reached. This occurs when the time which has just been clocked into the programmable timer 160 calls for a zero time duration for the particular program step.

The fifth event which may trigger an operation of the shift register 354 to occur is a logic "high" on a line 429 connected to an input of the NOR gate 424. This particular line 429 carries a logic "high" pulse in response to the first operation of the START pushbutton switch 28 following a "power on reset" operation. This will be discussed in greater detail below.

The fourth event which may trigger an operation of the shift register 354 is controlled by a low activated AND gate 428, the output of which is connected to an input of the NOR gate 424. The low activated AND gate 428 is actived whenever the START pushbutton switch 28 is operated during the "diagnostic" mode.

The sixth event which may trigger an operation of the shift register 354 is a "power on reset" which occurs when the machine 20 is initially turned on. The "power on reset" circuitry is discussed in detail under a separate heading below. At this point, it is sufficient to say an initial logic "high" pulse appears on a line 430 connected to an input of the NOR gate 424.

The seventh and last event which may trigger the shift register 354 results from the receipt of a logic "high" FULL TUB signal from the full tab switch contact 138 (FIG. 3) before the programmable timer 160 has reached its count. Under these conditions, a logic "high" pulse appears on the line 350 in a manner discussed next below.

OPERATION OF THE FULL TUB CIRCUITRY 372

The full tub circuitry 372 comprises the previously mentioned full tub debounce network 346, an RS flip-flop 431 comprising a pair of cross-coupled NOR gates 432 and 434, and a five-input low activated AND gate 436. The full tub circuitry 372 has three inputs. One input is a $\overline{FILL}$ signal from the decoding array 218 (FIG. 6B). $\overline{FILL}$ goes "low" when the particular program step according to FIG. 5 calls for a water-filling operation. This signal is applied to one of the inputs of the low activated AND gate 436.

Another input to the full tub circuitry 372 is the $\overline{S1}$ line from the shift register 354. This signal is also applied to an input of the low activated AND gate 436 to enable the low activated AND gate 436 during shift register step S1.

The third input to the full tub circuitry 372 is the FULL TUB signal along the line 139 from the full tub switch contact 138 (FIG. 3). FULL TUB is "high" when the tub is full. During a water-filling operation, $\overline{FILL}$ is "low," and this logic "low" is changed to "high" by an inverter 438 to enable the NAND gate 344. At the same time, the "low" $\overline{FILL}$ is applied to the lowermost input of the low activated AND gate 348, enabling it as well. The low activated AND gate 348 is an element of the debounce network 346. Thus, when FULL TUB goes "high" and is debounced, the output of the low activated AND gate 348 is "high."

The full tub circuitry 372 has two outputs. The first output is from the low activated AND gate 348 and is applied to the line 350. The line 350 is connected to the NOR gate 424 to trigger the shift register 354 (event number seven discussed above), and additionally is applied to an input of a NOR gate 440. The NOR gate 440 is followed by an inverter 442 which produces the RESET PT signal along the line 294 to reset the programmable timer 160 (FIG. 8) to Count No. 31 (FIG. 9) (corresponding to "count reached") when the washing tub fills with water.

The second output from the full tub logic 372 is the output of the low activated AND gate 436. This output is connected to a line 444. A logic "high" on the line 444 is used to stop the washing machine 20 in the middle of a washing cycle in the event the washing tub has not filled with water within the fifteen minutes allowed. This would be an abnormal condition, and the machine 20 would stop as a precaution.

Considering now the operation of the full tub circuitry 372, usually the tub is not filling, $\overline{FILL}$ is "high," and the output of the inverter 438 is "low." The NAND gate 344 is not enabled. Therefore, any FULL TUB signal which may be received does not pass beyond the NAND gate 344. Additionally, the "high" $\overline{\text{FILL}}$ signal applied to the lower input of the NOR gate 434 sets the flip-flop 431.

When the program sequencer 150 calls for a water-filling operation, for example during Step Nos. 3, 16, 27, and 34 in FIG. 5, $\overline{\text{FILL}}$ is "low." If a "high" FULL TUB signal is received before the programmable timer 160 reaches its count, the low activated AND gate 348 outputs a logic "high" pulse which resets the flip-flop 430, produces a RESET PT pulse through the NOR gate 440 to reset the programmable timer 160 to its "count reached" state, and triggers an operation of the shift register 354 through the NOR gate 424.

If, for some reason the tub does not fill during the fifteen minute period allowed, the programmable timer 160 reaches it count with a FULL TUB remaining "low." In this case, the low activated AND gate 436 is activated. The resultant logic "high" on a line 444 stops the machine in a manner hereinafter described.

POWER ON RESET AND INITIAL OPERATION

The circuitry related to and operation during the initial powering up of the controller 60 will now be described. Generally speaking, when power is first applied, the program sequencer counter 150 is set to Step No. O, the controller 60 is generally placed in an idle condition, and the numerical display is blinking. At this time, the controller 60 is waiting for the user to make cycle option selections and to operate the START pushbutton switch 28. Additionally, the "compute" mode is enabled.

When the user operates the push-to-start switch 28, the controller 60 then steps rapidly through the entire program in response to high speed clock pulses. When program Step No. 43 (FIG. 5) is reached, the "compute" mode is disabled and "run" mode operation immediately proceeds.

As previously mentioned, upon initial powering up, the inverter 332 outputs a momentary logic "high" POWER ON RESET signal along the line 334. The line 334 is connected to the set (S) input of a "power" flip-flop 446 which comprises a pair of cross-coupled NOR gates. A POWER OFF line 347 at the output of the "power" flip-flop 446 goes "low." The POWER OFF line 347 is connected to the base of the driver transistor 72 (FIG. 3) so that whenever POWER OFF subsequently goes "high," the coil 70 is energized to unlatch the switch 26 (FIG. 3) and turn off the machine 20.

A pair of D-type flip-flops 448 and 450 comprise an important portion of the power on reset circuitry. The data (D) inputs of both flip-flops are tied together and to the $\overline{\text{Q}}$ output of the flip-flop 448. The POWER ON RESET line 334 is connected to the set (S) input of the flip-flop 448 and to the reset (R) input of the flip-flop 450.

The logic circuitry associated with the clock (C) inputs of the flip-flops 448 and 450 includes a NOR gate 452, the output of which is connected to the clock (C) input of the flip-flop 450, and additionally, through an inverter 454, to the clock (C) input of the flip-flop 448.

The NOR gate 452 has three inputs, the uppermost of which is connected to the POWER OFF signal line. POWER OFF is "low" when the machine 20 is on. The middle input of the NOR gate 452 is connected to the line 444 from the full tub logic 372. The line 444 is "low" unless the full tub logic 372 determines that an abnormal filling condition exists. The lower input of the NOR gate is connected to the output of a low activated AND gate 456, which also supplies the line 429 connected to the NOR gate 424.

One input of the low activated AND gate 456 is connected to the $\overline{\text{PB}}$ line 342, which carries a momentarily "low" $\overline{\text{PB}}$ pulse each time the START pushbutton switch 28 is operated. The other input of the low activated AND gate 456 is connected to the output of a NOR gate 458. To complete the clock pulse circuitry of the flip-flops 448 and 450, the lower input of the NOR gate 458 is connected to the $\overline{\text{DIA}}$ line, and the upper input of the NOR gate 458 is connected to the $\overline{\text{Q}}$ output of the flip-flop 450.

A number of output connections are made to the Q and $\overline{\text{Q}}$ output lines 430 and 464, respectively, of the flip-flop 448. The Q line 430 is connected to the set (S) input of a "compute" flip-flop 466, which comprises a pair of cross-coupled NOR gates. The outputs of the flip-flop 466 are the COMPUTE and $\overline{\text{COMPUTE}}$ lines. When the flip-flop 466 is set, COMPUTE is "high," and when the flip-flop 466 is reset, COMPUTE is "low." $\overline{\text{COMPUTE}}$ is the inverse. The COMPUTE output line of the flip-flop 466 is connected to an input of a NOR gate 468, the output of which is connected through an inverter 470 to drive the UP/$\overline{\text{DOWN}}$ CONTROL LINE 174 of the counter 164 (FIG. 4). When COMPUTE is "high," UP/$\overline{\text{DOWN}}$ is "high" and the counter 164 counts up. So that the counter 164 also counts up during the "diagnostic" mode, the DIA line is also connected to an input of the NOR gate 468.

The Q flip-flop output line 430 is also connected to the set (S) input of a "blink" flip-flop 471, which comprises a pair of cross-coupled NOR gates. When the "blink" flip-flop 471 is set, the $\overline{\text{BLINK FF}}$ line goes "low." The $\overline{\text{BLINK FF}}$ line is connected to the lower input of a low activated AND gate 472, which outputs the BLANK DIGITS signal when activated. When BLANK DIGITS is "high" the numerical display 48 (FIGS. 1 and 4) is blanked. To produce a blinking of the display 48 when $\overline{\text{BLINK FF}}$ is "low," the upper input of the low activated AND gate 472 is connected to the BLINK output signal from the "divide-by-1800" counter 182.

To produce a RESET PT signal to initially set the programmable timer to its "count reached" condition, the flip-flop Q output line 430 is also connected to an input of the NOR gate 440. Thus, either a logic "high" along the line 350 from the full tub circuitry 372 or a logic "high" on the line 462 produces a "high" RESET PT pulse.

The Q output line 430 of the flip-flop 448 is also directly connected to the RESET line 208 which, when "high," resets the program sequence counter 150 to Step No. O and the up/down digital counter 164 for the numerical display 48 to zero.

The output line 430 is also connected to an input of a low activated AND gate 474. The other input of the low activated AND gate 474 is supplied by an inverter 476 having its input connected to the output of the low activated AND gate 456. When activated, the low activated AND gate 474 produces a logic "high" START SC signal to start the program sequence counter 150 (FIG. 6A) by forcing the counter 150 into the state corresponding to Step No. 1.

Lastly, for initial triggering of the shift register 354, the output line 430 is connected to an input of the NOR gate 424. This corresponds to the shift register triggering event discussed above.

The $\overline{Q}$ output line 464 of the flip-flop 448 is connected to an input of a low activated AND gate 478, the output of which is connected to the reset (R) input of the power flip-flop 446. The other input of the low activated AND gate 478 is connected to receive the $\overline{PWR\ OFF}$ signal from the information memory array 218 (FIG. 6). This connection permits the programming of the memory 218 to turn off the machine 20 at a particular Step Number. In the exemplary programming, Step No. 40 turns off the machine.

The operation of the power on reset circuitry, and particularly that associated with the D-type flip-flops 448 and 450, will now be described. The "normal" operation will be described first, and then operation during the "diagnostic" mode.

Initially, when the main power switch 26 is operated, the POWER ON RESET line 334 goes "high," setting the flip-flop 448 and resetting the flip-flop 450. The power flip-flop 446 is set and POWER OFF goes "low." The Q output line 430 of the flip-flop 448 goes "high," which sets the "compute" flip-flop 466; sets the "blink" flip-flop 471; resets the programmable timer 160 (FIG. 8), the program sequence counter 150 (FIG. 6A), and the up/down digital counter 164 (FIG. 4); and puts a logic "high" on the shift register reset line 358 to set and hold the shift register 354 in the "HLLLLL" state. The output of the low activated AND gate 340 is "high;" the outputs of the NOR gate 458, and the low activated AND gate 456 are "low;" the output of the NOR gate 452 is "high;" and the output of the inverter 454 is "low."

At this time the user inputs the various desired cycle selections and time durations.

Thereafter, a first operation of the START pushbutton switch 28 produces a "low" pulse on the $\overline{PB}$ line 342. The leading edge of the $\overline{PB}$ pulse results in a "low" to "high" transition at the output of the low activated AND gate 456, and the logic "high" signal is conducted along the line 429 to the NOR gate 424 to continue to hold the shift register reset line 358 "high." Additionally, on the leading edge of the $\overline{PB}$ pulse, the output of the inverter 454 goes from "low" to "high" to clock the flip-flop 448. Since the data (D) input of the flip-flop 448 is initially "low," the flip-flop 448 toggles. The Q output line 430 goes "low." This "low" and a "low" output of the inverter 476 activate the low activated AND gate 474, beginning a "high" START SC pulse to set and hold the program sequencer counter 150 in Step No. 1.

The trailing edge of the $\overline{PB}$ pulse (a "low" to "high" transition) causes the output of the low activated AND gate 456 to go "low" and the output of the NOR gate 452 to go "high." This clocks the flip-flop 450. Since the data (D) input is "high," the flip-flop 450 toggles. Additionally, the output of the inverter 476 goes "high" causing the output of the low activated AND gate 474 to go "low." The START SC pulse thus ends, releasing the program sequence counter 150. The program sequencer counter 150 remains in Step No. 1 because no SC CLOCK pulse is produced at this point. Lastly, on the trailing edge of the $\overline{PB}$ pulse, the line 429 goes "low," deactivating the NOR gate 424 and releasing the shift register reset line 358.

At this point, the controller 60 is operating in the "compute" mode as previously described. In Step No. 1, the "blink" flip-flop 471 is reset by a logic "high" RESET BLINK signal from the memory 218 (FIG. 6B). In Step No. 43, the "compute" flip-flop 466 is reset by a logic "high" RESET COMPUTE signal from the memory 218. Resetting of the "compute" flip-flop 466 causes COMPUTE to go "low" and $\overline{COMPUTE}$ to go "high," putting the controller 60 in the "run" mode. This includes letting UP/$\overline{DOWN}$ go "low."

During normal operation, the controller may be stopped and reset at any time. There are three ways this may occur, corresponding to the three inputs of the NOR gate 452. Considering first what happens when the NOR gate 452 is activated during normal operation, the inverter 454 again clocks the flip-flop 448. Since the data (D) input is initially "high," the flip-flop 448 toggles. At this point the same events occur as occur when the flip-flop 448 is initially set by a logic "high" on the POWER ON RESET line 334, previously discussed.

Now, the three ways in which the NOR gate 452 may be activated to reset the controller 60 wil be described. First, there is a normal end of program execution. This corresponds to the upper input of the NOR gate 452 and occurs when the "power" flip-flop 446 is reset by a logic "low" $\overline{PWR\ OFF}$ signal from the memory 218 (FIG. 6B) applied to the low activated AND gate 478. POWER OFF goes high. The second way the NOR gate 452 may be activated occurs when an abnormal condition is sensed by the "full tub" circuitry 372. When activated, the "full tub" circuitry outputs a logic "high" on the line 444 connected to the middle input of the NOR gate 452. The third way in which the NOR gate 452 may be activated to reset the controller 60 during normal operation is a second operation of the START pushbutton switch 28. This corresponds to the lower input of the NOR gate 452. Thus, the user may at any time terminate execution of a washing program by operating the START switch a second time.

Operation of the power on reset circuitry during the "diagnostic" mode will now be described. The response to the "high" on the POWER ON RESET line 334 is basically the same as for normal operation. One difference is that, during the initial "compute" mode operation, no D CLOCK pulses are produced and the Up/Down Digital Counter 164 and the numerical display 48 remain in a ZERO count state. Producing of D CLOCK pulses is prevented by the AND gate 391 which has a "high" output to disable the low activated AND gate 390 when both DIA and COMMUTE are "high." An initial run through the "compute" mode is required so that the output gates associated with the information array (FIG. 6B) are enabled, permitting operation of the various solenoids in the machine 20.

In the "diagnostic" mode, however, the response to operations of the START pushbutton switch 28 is quite different. During the normal operation previously described, a first operation of the START pushbutton switch 28 starts the machine 20, and a second operation at any time stops the machine 20 through a sequence which begins with clocking the flip-flop 448. In contrast, during "diagnostic" mode operation, a second and subsequent operations of the START/STOP pushbutton switch 28 step the sequence controller counter 150 and do not stop the machine 20. This difference in operation is effected by preventing clocking of the flip-flops 448 and 450 on all but the first operation of the START/STOP pushbutton switch 28.

Specifically, this difference in operation is accomplished by selectively disabling the low activated AND gate 456 to prevent passage of $\overline{PB}$ pulses to the NOR gate 452. During normal operation, $\overline{DIA}$ applied to the lower input of the NOR gate 458 is always "high" and activating the NOR gate 458. The resultant "low" gate output always enables the AND gate 456. During "diagnostic" mode operation, $\overline{DIA}$ is "low" and any activation of the NOR gate 458 must be the result of a "high38 $\overline{Q}$ output of the flip-flop 450. Following the initial "power on reset," the $\overline{Q}$ output line of the flip-flop 450 is "high." Thus the NOR gate 458 is initially enabled. However, following the trailing edge of the first $\overline{PB}$ pulse, the $\overline{Q}$ output line of the flip-flop 450 goes "low" and remains "low."

Additionally, following the trailing edge of the first $\overline{PB}$ pulse, the "low" $\overline{Q}$ output line of the flip-flop 450 enables the low activated AND gate 428 which is connected through the NOR gate 424 to trigger the shift register 354.

Subsequent $\overline{PB}$ pulses during "diagnostic" mode operation are then routed through the low activated AND gate 428 to the NOR gate 424. As a result, "high" pulses are produced on the shift register reset line 358 to trigger an operation of the shift register for each operation of the START pushbutton switch.

DIAGNOSTIC MODE OPERATION

Other aspects of the operation during the "diagnostic" mode which are not directly related to the "Power ON Reset" circuitry will now be discussed.

During "diagnostic" mode operation, the program sequence counter 150 progresses through the wash program in response to manual operations of the START/STOP switch 28, with $\overline{PB}$ pulses being routed through the low activated AND gate 428 as previously described. The thirty second pulses from the low speed clock 182 along the line 351 are not used at all. They are interrupted by the low activated AND gate 420 which has a "high" DIA signal applied to its middle input.

At the same time, the up/down digital counter 164 and the numerical display 48 increment by one for each operation of the START/STOP switch 28. DIA applied to the NOR gate 468 causes the UP/$\overline{DOWN}$ line 174 to be "high" so the counter 164 counts up. As previously mentioned under the heading "Shift Register Steps," each triggering of the shift register 354 during the "diagnostic" produces two D CLOCK pulses (during shift register steps S2 and S4) so that the binary element 177 outputs a single clock pulse for the counter 164. Thus, the numerical display 48 provides meaningful information to a service technician. By referring to the Program Sequence Chart of FIG. 5 and taking into account the options selected, the service technician can determine, from the numerical display 48, what Step Number the controller 60 is in and which electromechanical loads in the washing machine 20 should be energized.

The programmable timer 160 is not employed during the "diagnostic" mode operation. As also previously mentioned under the heading "Shift Register Steps," each triggering of the shift register 354 during the "diagnostic" mode produces an SC CLOCK pulse during shift register step S2. This occurs independently of the state of the programmable timer 160.

Program jump as well as increment instructions are recognized during "diagnostic" mode operation. If a program jump is required from a particular program Step Number, the sequence control logic 152 comprising the upper decoding memory array 214, the "jump to" memory matrix 201, and the AND-OR select gates (e.g. 191) shown in FIG. 6A causes the jump to occur upon receipt of an SC CLOCK pulse.

ALTERNATIVE CONTROLLER EMBODIMENT

Referring now to FIG. 11, an alternative controller architecture is generally depicted in block diagram form. The FIG. 11 structure is more generalized, and is intended to provide greater flexibility in programming for various applications. For convenience, the FIG. 11 embodiment is described below in terms of how it differs from the previous embodiment. It will be appreciated that many aspects are substantially the same, and these aspects are generally not mentioned. There are two primary differences compared to the previous embodiment: First, the way in which the program jumps and variable times are stored is altered. The memory locations for a particular program Step Number have either a jump address, or a new variable time, but not both. While this requires two Step Number memory locations to effect a program jump to a Step Number which has a non-zero time duration, added flexibility is achieved. Second, the various separate memories employed to store the jump conditions and the variable time conditions are combined into a more general purpose structure. For each program Step for which a functional result such as a jump or a time duration may vary from one execution to the next depending upon conditional inputs, a unique "multiple condition code" is assigned.

In FIG. 11, the programmable timer 160 of FIGS. 4 and 8 and the program sequence counter 150 of FIGS. 4 and 6A have the same general structure and function as before. A difference is that the present inputs of the programmable timer 160 and the program sequence counter 150 are both connected to a common six-bit data bus 502. This sharing of the bus 502 is possible because, upon the entering of a new program Step, modified master control logic 180' directs either a SET PT signal to the programmable timer 160 to cause the programmable timer to load in a new time, or a LOAD SC signal to the program sequence counter 150, but not both. The LOAD SC signal is equivalent to a logic "high" on the "enable preset" line 199 extending from the "jump to" memory matrix 201 of FIG. 6A.

In the memory structure of FIG. 11, a sequence counter decoder 504 corresponds directly with the lower decoding memory array 216 of FIG. 6B. Each horizontal row of the decoder 504 may be viewed as NAND gate, and one of the decoder 504 output lines 505 goes "low" in response to each particular program Step. In FIG. 11, the particular programming is not shown and the heavy black dots are thus omitted.

An information memory array 506 is connected to the decoder 504 output lines 505. Each vertical row of the array 506 may be viewed as a low-activated OR gate. The information array 506 comprises four separate sections: a multiple condition coder 508 having four output lines supplying a four-bit data bus 509, a jump/time table 510 supplying the data bus 502, a jump/time control bit section 512, and an output section 514. Compared to the previous embodiment, the multiple condition coder 508, the jump/time table 510, and the jump/time control bit section 512 are generally new; and the output section 514 corresponds directly with the information memory array 218 of FIG. 6B.

The programming of the multiple condition coder 508 is such that a unique code is assigned to each program Step for which a functional result may vary from one execution of the program to the next. Examples of such program Steps from the particular program sequences of FIG. 5 are Step Nos. 2, 15 and 30, where jumps may occur conditioned on user cycle selection inputs; and Step Nos. 6, 21 and 38, where the time duration is conditioned on user time selection inputs. For program Steps not requiring a multiple condition code, there is no entry in the multiple condition coder 508.

The jump/time table 510 has an entry for each program Step which is not assigned a multiple condition code. The table 510 entries are either unconditional jump addresses or unconditional step time durations.

The jump/time control bit section 512 has a single bit for each Step, the single bit indicating whether the jump/time table 510 entry is a time or a jump address. The output of the jump/time control bit section 512 is received by the modified master control logic 180', which in response generates either a SET PT signal or a LOAD SC signal at the appropriate time.

The FIG. 11 structure also has a condition decoder 516 which includes two sections: an input decoder section 518, and a multiple condition decoder section 520. The input decoder section 518 receives external inputs such as the "user cycle selection," the "user soak time select," the "user wash time select," and the "user spin dry time select." For added flexibility, the input decoder section 518 may receive internallygenerated inputs which can affect program execution. One example is an input from the "full tub" circuitry. The multiple condition decoder section 520 receives the multiple condition codes carried by the four-bit bus 509 from the multiple condition coder section 508. The multiple condition decoder section 520 has multiple entries for each particular multiple condition code, there being one entry for each possible condition. However, due to the input decoder section 518, only one of the multiple entries for each multiple condition code is fully decoded at a time. Each horizontal row of the condition decoder 516 may be viewed as a NAND gate, and only one of the decoder 516 output lines 521 goes "low," at a time in response to a decoded condition.

An information memory array connected to the horizontal output lines 521 of the condition decoder 516 comprises another jump/time table 522. The table 522 entries are either jump addresses or step time durations, to be directed along the six-bit data bus 502 to either the programmable timer 160 or the program sequence counter 150. Although both of the jump/time tables 510 and 520 supply the same data bus 502, no conflict arises because only one of the tables has an entry for each particular program Step.

The condition decoder 516 and the jump/time table 522 together contain all the programming information which was scattered about a number of different memories in the previous embodiment. Specifically, the information in the upper decoding array 214 and the "jump to" matrix 201 (FIG. 6A), and the time tables 298, 300, 302 and 290 (FIG. 8) is included. The result is a highly flexible structure.

In the operation of the FIG. 11 structure, whenever the programmable timer 160 times out and generates a COUNT REACHED signal, the master control logic 180' increments the program sequence counter 150. The new Step Number is decoded by the sequence counter decoder 504, and one of the output lines 507 goes low.

If the new Step does not have a multiple condition code, then the information in the jump/time table section 510 is directed for loading into either the programmable timer 160 or the program sequence counter 150, but not both, depending upon the entry in the jump/time control bit section 512. If a time is loaded, the controller remains in the Step until the programmable time 160 times out. If a jump address is loaded, the sequence counter 150 jumps to the new Step, which is immediately decoded by the sequence counter decoder 504 to begin the process again.

If, on the other hand, the new Step does have a multiple condition code, then the multiple condition coder 508 outputs a code along the bus 509 to the multiple condition decoder section 520. One output line 521 of the multiple condition decoder 516 goes low, and the information in the jump/time table 522 is directed to either the programmable timer 160 or the program sequence counter 150, but not both, depending upon the entry in the jump/time control bit section 512.

CONCLUSION

It will be apparent, therefore, that the foregoing describes a versatile electronic sequence controller concept and two embodiments thereof. While certain details of the first embodiment disclosed pertain closely to the particular application, namely a controller for a domestic clothes washing machine, it will be further apparent that the overall approach and concept of the invention is much more general. It is realized that modifications and changes will occur to those skilled in the art. It is therefore to be understood that the appended claims are intended to cover all such modifications and changes as fall within the true spirit and scope of the invention.

What is claimed is:

1. An electronic controller comprising:
   a digital program sequence counter capable of stepping from one state to the next in response to clock pulses, and capable further of selectively either stepping to the next state of a regular counting sequence, or jumping to a particular arbitrary state, each sequence counter state representing a particular program step;
   a programmable digital timer for establishing any one of a plurality of different time durations, said programmable timer operable to count clock pulses and to output a signal when the number of clock pulses corresponding to a programmed time duration have been inputted;
   a timer setting control operable to program said programmable timer;
   program memory means responsive to the state of said program sequence counter for directing said timer setting control to program a time duration desired for any particular program step;
   control logic means for directing the operation of said program sequence counter and said digital timer to effect periodic program advancing operations, said control logic means operable in the event a signal has not been received from said programmable timer to direct a clock pulse to said programmable timer for each program advancing operation, and said control logic means operable in the event a signal is received from said programmable timer to direct a clock pulse to said program sequence counter to cause stepping to the next program step, whereupon said program memory means directs said timer setting control to program a new time duration into said programmable timer; and logic means responsive to an external input and to said program memory means for controlling whether a program jump from a particular program step to another program step occurs.

2. An electronic controller according to claim 1, wherein said logic means responsive to an external input is capable of causing a jump from a program step to a particular one of a plurality of possible other program steps to occur depending upon the particular state of the external input.

3. An electronic controller comprising:

a digital program sequence counter capable of stepping from one state to the next in response to clock pulses, and capable further of selectively either stepping to the next state of a regular counting sequence, or jumping to a particular arbitrary state, each sequence counter state representing a particular program step;

a programmable digital timer for establishing any one of a plurality of different time durations, said programmable timer operable to count clock pulses and to output a signal when the number of clock pulses corresponding to a programmed time duration have been inputted;

a timer setting control operable to program said programmable timer;

program memory means responsive to the state of said program sequence counter for directing said timer setting control to program a time duration desired for any particular program step, said program memory means including a sequence counter decoder for generating different outputs in response to the various states of said program sequence counter, and said program memory means further including a memory array receiving the outputs of said sequence counter decoder, said memory array including a jump/time table section and a jump/time control bit section, for particular outputs of said sequence counter decoder said jump/time table section having either information representing a new time duration to be directed to said programmable timer or information representing a jump address to be directed to said sequence counter, but not both, and said jump/timer control bit section having information indicating whether the jump/time table entry is a time duration or a jump address; and control logic means responsive to the information in said jump/time control bit section to generate appropriate control signals for directing the operation of said program sequence counter and said programmable timer to effect periodic program advancing operations, said control logic means operable in the event a signal has not been received from said programmable timer to direct a clock pulse to said programmable timer for each program advancing operation, and said control logic means operable in the event a signal is received from said programmable timer to direct a clock pulse to said program sequence counter to cause stepping to the next program step, whereupon said program memory means directs said timer setting control to program a new time duration into said programmable timer.

4. An electronic controller comprising:

a digital program sequence counter capable of stepping from one state to the next in response to clock pulses, and capable further of selectively either stepping to the next state of a regular counting sequence, or jumping to a particular arbitrary state, each sequence counter state representing a particular program step;

a programmable digital timer for establishing any one of a plurality of different time durations, said programmable timer operable to count clock pulses and to output a signal when the number of clock pulses corresponding to a programmed time duration have been inputted;

a timer setting control operable to program said programmable timer;

program memory means responsive to the state of said program sequence counter for directing said timer setting control to program a time duration desired for any particular program step, said program memory means including a sequence counter decoder for generating different outputs in response to the various states of said program sequence counter, and said program memory means including a memory array receiving the outputs of said sequence counter decoder, said memory array including a jump/time table section and a jump/time control bit section, for particular outputs of said sequence counter decoder said jump/time table section having either information representing a new time duration to be directed to said programmable timer or information representing a jump address to be directed to said sequence counter, but not both, and said jump/time control bit section having information indicating whether the jump/time table entry is a time duration or a jump address; and said memory array also including a multiple condition coder section, said multiple condition coder section having entries for particular outputs of said sequence counter decoder, which particular outputs represent program steps for which a functional result may vary from one execution of a program to the next;

said program memory means further including a condition decoder responsive to external inputs and to the entries of said multiple condition coder section for generating different outputs in response to various conditions;

said program memory means further including another jump/time table receiving the outputs of said condition decoder, for particular outputs of said condition decoder said other jump/time table having either information representing a new time duration to be directed to said programmable timer or information representing a jump address to be directed to said sequence counter, but not both; and control logic means responsive to the information in said jump/time control bit section to generate appropriate control signals for directing the operation of said program sequence counter to effect periodic program advancing operations, said control logic means operable in the event a signal has not been received from said programmable timer to direct a clock pulse to said programmable timer for each program advancing operation, and said control logic means operable in the event a signal is received from said programmable timer to direct a clock pulse to said program sequence counter to cause stepping to the next program step, whereupon said program memory means directs said timer setting control to program a new time duration into said programmable timer.

5. An electronic controller comprising:

a digital program sequence counter capable of stepping from one state to the next in response to clock pulses, and capable further of selectively either stepping to the next state of a regular counting sequence, or jumping to a particular arbitrary state, each sequence counter state representing a particular program step;

a programmable digital timer for establishing any one of a plurality of different time durations, said programmable timer operable to count clock pulses and to output a signal when the number of clock pulses corresponding to a programmed time duration have been inputted;

a timer setting control operable to program said programmable timer;

program memory means responsive to the state of said program sequence counter for directing said timer setting control to program a time duration desired for any particular program step;

control logic means for directing the operation of said program sequence counter and said digital timer to effect periodic program advancing operations, said control logic means operable in the event a signal has not been received from said programmable timer to direct a clock pulse to said programmable timer for each program advancing operation, and said control logic means operable in the event a signal is received from said programmable timer to direct a clock pulse to said program sequence counter to cause stepping to the next program step, whereupon said program memory means directs said timer setting control to program a new time duration into said programmable timer; and logic means responsive to an external input and to said program memory means for controlling whether a program jump from a particular program step to another program step occurs, said logic means including:

a decoder responsive to the state of said program sequence counter and to the external input for outputting a signal on a particular line when a particular program sequence counter state representative of a program step from which a jump may occur occurs in combination with a particular state of the external input; and a memory having stored therein a representation of a particular program sequence counter state representative of a program step to which a jump may occur and responsive to a signal on the particular decoder output line for presenting the stored representation to said program sequence counter.

6. An electronic controller comprising:

a digital program sequence counter capable of stepping from one state to the next in response to clock pulses, and capable further of selectively either stepping to the next state of a regular counting sequence, or jumping to a particular arbitrary state, each sequence counter state representing a particular program step;

a programmable digital timer for establishing any one of a plurality of different time durations, said programmable timer operable to count clock pulses and to output a signal when the number of clock pulses corresponding to a programmed time duration have been inputted;

a timer setting control operable to program said programmable timer;

program memory means responsive to the state of said program sequence counter for directing said timer setting control to program a time duration desired for any particular program step;

control logic means for directing the operation of said program sequence counter and said digital timer to effect periodic program advancing operations, said control logic means operable in the event a signal has not been received from said programmable timer to direct a clock pulse to said programmable timer for each program advancing operation, and said control logic means operable in the event a signal is received from said programmable timer to direct a clock pulse to said program sequence counter to cause stepping to the next program step, whereupon said program memory means directs said timer setting control to program a new time duration into said programmable timer; and logic means responsive to an external input and to said program memory means for controlling whether a program jump from a particular program step to another program step occurs, said logic means being capable of causing a jump from a program step to a particular one of a plurality of possible other program steps to occur depending upon the particular state of the external input, and said logic means including:

a decoder responsive to the state of said program sequence counter and to the external input for outputting a signal on a particular one of a plurality of lines when a particular program sequence counter state representative of a program step from which a jump may occur occurs in combination with a particular one of a plurality of states of the external input, the various ones of the plurality of decoder output lines all corresponding to the same program sequence counter state but to different states of the external input; and a memory having stored therein representations of a plurality of particular program sequence counter states representative of program steps to which jumps may occur from the particular program step from which a jump may occur, each of the stored representations corresponding to a particular one of the different states of the external input, and said memory responsive to a signal on a particular one of the plurality of decoder output lines for presenting the corresponding stored representation to the program sequence counter.

7. An electronic controller comprising:

a digital program sequence counter capable of stepping from one state to the next in response to clock pulses, where each counter state represents a particular program step, said program sequence counter capable further of selectively either stepping to the next state of a regular counting sequence or jumping to a particular arbitrary state;

program memory means responsive to the state of said program sequence counter, said program memory means having at least one output connection to activate an external load device during a particular program step;

control logic means for directing the operation of said program sequence counter to effect periodic program advancing operations, said control logic means operable for each program advancing operation to direct a clock pulse to said program sequence counter to cause stepping to the next program step, whereupon said program memory means directs said timer setting control to program a new time duration into said programmable timer; and logic means responsive to an external input for controlling whether a program jump from a particular program step to another program step occurs.

8. An electronic controller according to claim 7, wherein said logic means responsive to an external input is capable of causing a jump from a program step to a particular one of a plurality of possible other program steps to occur depending upon the particular state of the external input.

9. An electronic controller comprising:
a digital program sequence counter capable of stepping from one state to the next in response to clock pulses, where each counter state represents a particular program step, said program sequence counter capable further of selectively either stepping to the next state of a regular counting sequence or jumping to a particular arbitrary state;
program memory means responsive to the state of said program sequence counter, said program memory means having at least one output connection to activate an external load device during a particular program step;
control logic means for directing the operation of said program sequence counter to effect periodic program advancing operations, said control logic means operable for each program advancing operation to direct a clock pulse to said program sequence counter to cause stepping to the next program step, whereupon said program memory means directs said timer setting control to program a new time duration into said programmable timer; and
logic means responsive to an external input for controlling whether a program jump from a particular program step to another program step occurs, said logic means including:
a decoder responsive to the state of said program sequence counter and to the external input for outputting a signal on a particular line when a particular program sequence counter state representative of a program step from which a jump may occur occurs in combination with a particular state of the external input; and
a memory having stored therein a representation of a particular program sequence counter state representative of a program step to which a jump may occur and responsive to a signal on the particular decoder output line for presenting the stored representation to said program sequence counter.

10. An electronic controller comprising:
a digital program sequence counter capable of stepping from one state to the next in response to clock pulses, where each counter state represents a particular program step, said program sequence counter capable further of selectively either stepping to the next state of a regular counting sequence or jumping to a particular arbitrary state;
program memory means responsive to the state of said program sequence counter, said program memory means having at least one output connection to activate an external load device during a particular program step;
control logic means for directing the operation of said program sequence counter to effect periodic program advancing operations, said control logic means operable for each program advancing operation to direct a clock pulse to said program sequence counter to cause stepping to the next program step, whereupon said program memory means directs said timer setting control to program a new time duration into said programmable timer; and
logic means responsive to an external input for controlling whether a program jump from a particular program step to another program step occurs, said logic means being capable of causing a jump from a program step to a particular one of a plurality of possible other program steps to occur depending upon the particular state of the external input, and said logic means including:
a decoder responsive to the state of said program sequence counter and to the external input for outputting a signal on a particular one of a plurality of lines when a particular program sequence counter state representative of a program step from which a jump may occur occurs in combination with a particular one of a plurality of states of the external input, the various ones of the plurality of decoder output lines all corresponding to the same program sequence counter state but to different states of the external input; and
a memory having stored therein representations of a plurality of particular program sequence counter states representative of program steps to which jumps may occur from the particular program step from which a jump may occur, each of the stored representations corresponding to a particular one of the different states of the external input, and said memory responsive to a signal on a particular one of the plurality of decoder output lines for presenting the corresponding stored representation to the program sequence counter.

11. An electronic controller comprising:
a digital program sequence counter capable of stepping from one state to the next in response to clock pulses, each sequence counter state representing a particular program step;
a programmable digital timer for establishing any one of a plurality of different time durations, said programmable timer operable to count clock pulses and to output a signal when the number of clock pulses corresponding to a programmed time duration have been inputted;
a timer setting control operable to program said programmable timer;
program memory means responsive to the state of said program sequence counter for directing said timer setting control to program a time duration desired for any particular program step; and
control logic means for directing the operation of said program sequence counter and said digital timer to effect periodic program advancing operations, said control logic means operable in the event a signal has not been received from said programmable timer to direct a clock pulse to said programmable timer for each program advancing operation, and said control logic means operable in the event a signal is received from said programmable timer to direct a clock pulse to said program sequence counter to cause stepping to the next program step, whereupon said program memory means directs said timer setting control to program a new time duration into said programmable timer.

12. An electronic controller according to claim 11, which further comprises a basic clock for producing periodic timing pulses and wherein program advancing operations occur in response to said timing pulses.

13. An electronic controller according to claim 11, wherein said program memory means has at least one output connection to activate an external load device during a particular program step.

14. An electronic controller according to claim 13, which is adapted to control a washing appliance.

15. An electronic controller according to claim 13, wherein said output connection to the external load device includes logic means responsive to an external input for further control of the output function.

16. An electronic controller according to claim 15, which is adapted to control a washing applicance, and wherein the external load device controls the temperature of incoming fluid.

17. An electronic controller according to claim 11, wherein said timer setting control is capable of selectively programming said programmable timer either for a time duration determined by said program memory means, or for a time duration determined by an external input.

18. An electronic controller according to claim 17, wherein said timer setting control responds to an output of said program memory means for selecting whether the programmed time duration is determined by said program memory means or by the external input.

19. An electronic controller according to claim 11, wherein said program sequence counter includes capability for selectively either stepping to the next state of a regular counting sequence, or jumping to a particular arbitrary state determined by said program memory means responsive to the state of said program sequence counter.

20. An electronic controller according to claim 19, wherein said program memory means comprises a sequence counter decoder for generating different outputs in response to the various states of said program sequence counter.

21. An electronic controller according to claim 20, wherein said program memory further comprises a memory array receiving the outputs of said sequence couinter decoder, said memory array including an output section for producing a signal to activate at least one external load device in response to a particular output of said sequence counter decoder.

22. An electronic appliance controller comprising:

a digital program sequence counter capable of stepping from one state to the next in response to clock pulses, where each counter state represents a particular program step, said program sequence counter capable further of selectively either stepping to the next state of a regular counting sequence or jumping to a particular arbitrary state;

a programmable digital timer for establishing any one of a plurality of different time durations, said programmable timer operable to count clock pulses and to output a signal when the number of clock pulses corresponding to a programmed time duration have been inputted;

a timer setting control operable to program said programmable timer;

program memory means responsive to the state of said program sequence counter, said program memory means having an output for directing the operation of said timer setting control and having at least one output connection to activate an external load device during a particular program step; and control logic means for directing the operation of said program sequence counter and said digital timer to effect periodic program advancing operations, said control logic means operable in the event a signal has not been received from said programmable timer to direct a clock pulse to said programmable timer for each program advancing operation, and said control logic means operable in the event a signal is received from said programmable timer to direct a clock pulse to said program sequence counter to cause stepping to the next program step, whereupon said program memory means directs said timer setting control to program a new time duration into said programmable timer.

23. An electronic appliance controller according to claim 22, wherein said timer setting control is capable of selectively programming said programmable timer either for a time duration determined by said program memory means, or for a time duration determined by an external input.

* * * * *